(12) United States Patent
Higo et al.

(10) Patent No.: US 9,251,057 B2
(45) Date of Patent: Feb. 2, 2016

(54) NONVOLATILE CACHE MEMORY, PROCESSING METHOD OF NONVOLATILE CACHE MEMORY, AND COMPUTER SYSTEM

(71) Applicant: Sony Corporation, Tokyo (JP)

(72) Inventors: Yutaka Higo, Kanagawa (JP); Masanori Hosomi, Tokyo (JP); Hiroyuki Ohmori, Kanagawa (JP); Kazuhiro Bessho, Kanagawa (JP); Tetsuya Asayama, Tokyo (JP); Kazutaka Yamane, Kanagawa (JP); Hiroyuki Uchida, Kanagawa (JP)

(73) Assignee: Sony Corporation, Tokyo (JP)

( * ) Notice: Subject to any disclaimer, the term of this patent is extended or adjusted under 35 U.S.C. 154(b) by 405 days.

(21) Appl. No.: 13/681,999

(22) Filed: Nov. 20, 2012

(65) Prior Publication Data

US 2013/0139007 A1     May 30, 2013

(30) Foreign Application Priority Data

Nov. 29, 2011  (JP) .................................. 2011-259796

(51) Int. Cl.
| | | |
|---|---|---|
| G06F 12/02 | (2006.01) | |
| G06F 11/16 | (2006.01) | |
| G06F 12/08 | (2006.01) | |
| G06F 11/14 | (2006.01) | |
| G06F 11/10 | (2006.01) | |

(52) U.S. Cl.
CPC ........ *G06F 12/0246* (2013.01); *G06F 11/1064* (2013.01); *G06F 11/1441* (2013.01); *G06F 11/1666* (2013.01); *G06F 12/0895* (2013.01); *G06F 2212/222* (2013.01)

(58) Field of Classification Search
None
See application file for complete search history.

(56) References Cited

U.S. PATENT DOCUMENTS

| 8,352,672 | B2 * | 1/2013 | Suda .............................. 711/103 |
|---|---|---|---|
| 2010/0023681 | A1 | 1/2010 | Sinclair et al. |
| 2013/0111202 | A1 * | 5/2013 | Zeng ................................. 713/2 |

FOREIGN PATENT DOCUMENTS

| JP | 2004-502237 A | 1/2004 |
|---|---|---|
| JP | 2007-041798 A | 2/2007 |
| JP | 2011-138273 A | 7/2011 |
| JP | 2011-150653 | 8/2011 |
| WO | WO-2009/028298 | 3/2009 |
| WO | WO-2011/081168 A1 | 7/2011 |
| WO | WO-2011/107882 A2 | 9/2011 |

OTHER PUBLICATIONS

Japanese Office Action issued May 12, 2015 for corresponding Japanese Application No. 2011-259796.
Sun, Hongbin, et al. "Design Techniques to Improve the Device Write Margin for MRAM-based Cashe Memory" Proceedings of the 21st Edition of the Great Lakes Symposium on VLSI, ACM, May 2-4, 2011 pp. 97-102.

* cited by examiner

*Primary Examiner* — Midys Rojas
(74) *Attorney, Agent, or Firm* — Michael Best & Friedrich LLP

(57) ABSTRACT

Disclosed is a nonvolatile cache memory including a nonvolatile memory part and a cache controller. The nonvolatile memory part is configured to store cache data. The cache controller is configured to control reading and writing of the cache data with respect to the nonvolatile memory part. Further, the cache controller is configured to perform, as a preparation for an interruption of power supply, standby preparation processing to generate standby state data and store the generated standby state data in the nonvolatile memory part. Further, the cache controller is configured to perform, at resumption of the power supply, restoration processing of the cache data stored in the nonvolatile memory part using the standby state data.

22 Claims, 18 Drawing Sheets

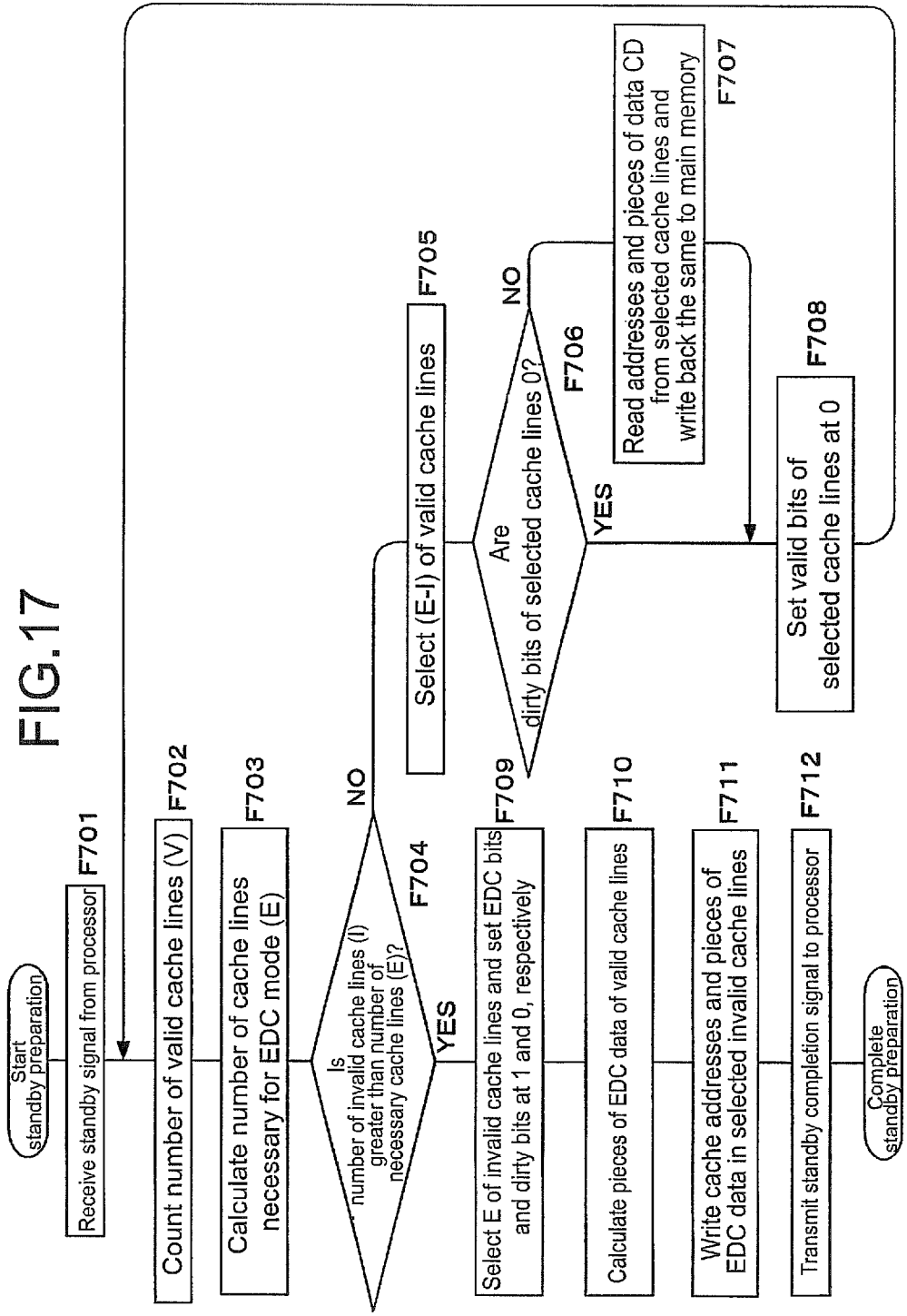

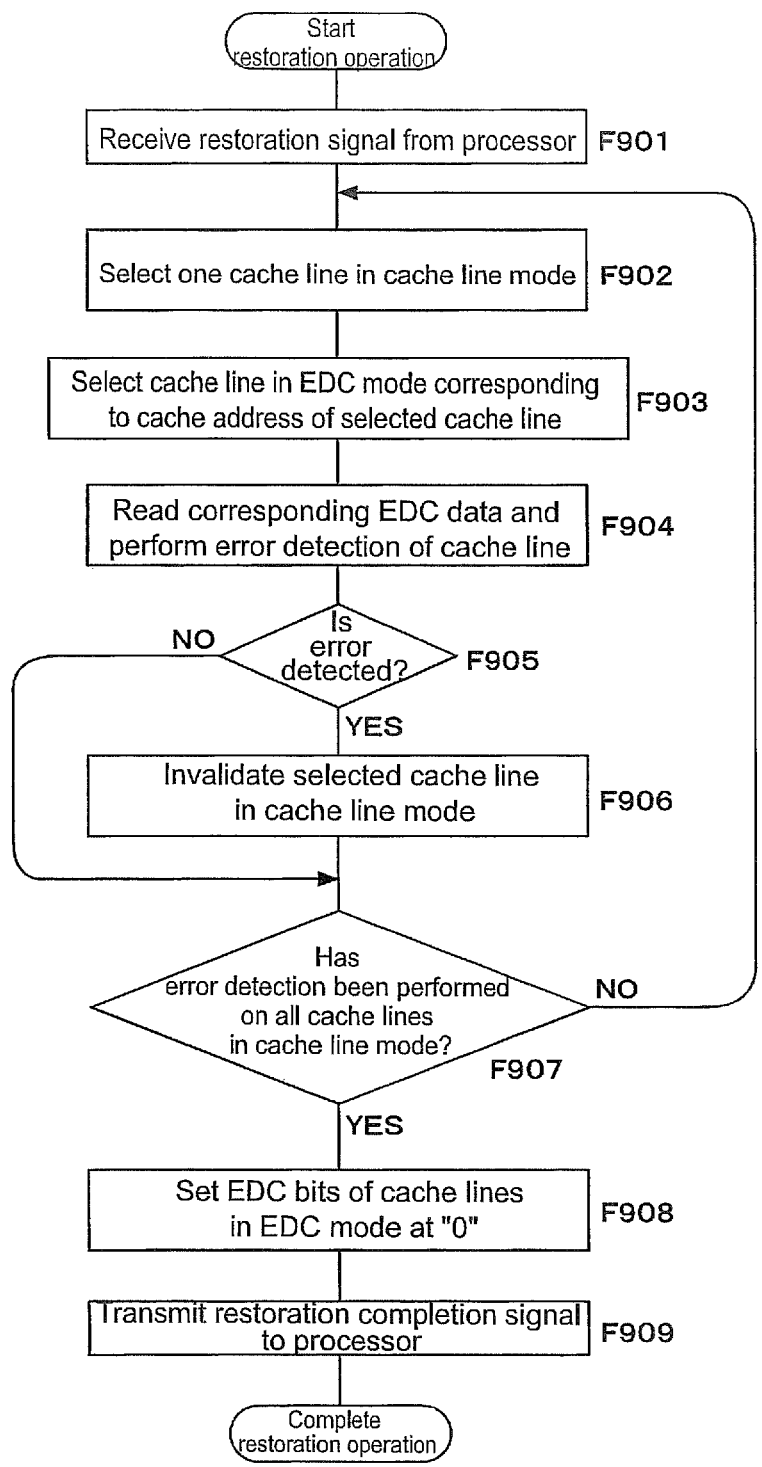

NONVOLATILE CACHE MEMORY, PROCESSING METHOD OF NONVOLATILE CACHE MEMORY, AND COMPUTER SYSTEM

BACKGROUND

The present disclosure relates to a nonvolatile cache memory, a processing method of the nonvolatile cache memory, and a computer system having the nonvolatile cache memory.

In a known computer system, a processor acquires data and information such as a command from a main memory or updates the information of the main memory. At this time, accessing performance such as the latency of the main memory is inferior to the processing performance of the processor. Therefore, a difference in the performance between the main memory and the processor causes a bottleneck to the total performance of the computer system.

A cache memory is a memory newly provided in a storage layer to eliminate the bottleneck and arranged between the processor and the main memory.

In general, a SRAM (Static Random Access Memory) that operates at higher speed than the main memory is used as the cache memory.

When the processor acquires the data from the main memory or updates the information of the main memory, the same data is also stored in the cache memory. Next, when the same data is acquired or updated, the high-speed cache memory performs the input and output of the data instead of the main memory. Thus, the difference in the performance between the main memory and the processor is covered up, whereby the high-speed computer system is constructed.

Meanwhile, in order to apply a computer system to mobile equipment, there is an increasing demand for a power saving control technology. In a semiconductor circuit technology used in the latest high performance processor, a ratio of a leakage current to power consumption is large. Therefore, there has been used a technology so-called power gating to interrupt power supply to a processor to prevent a leakage current from occurring, for example, when there is no command to be processed.

On the other hand, a SRAM used as a cache memory is a volatile memory. Therefore, data stored in the SRAM is lost as the power supply is interrupted. In view of the problem, Japanese Patent Application Laid-open No. 2011-150653 discloses a method of interrupting power supply only to a controller that controls the input and output of data while retaining the power supply to a SRAM cell array that stores the data among parts constituting a cache memory to reduce power consumed in the cache memory.

SUMMARY

However, because a leakage current also occurs in a SRAM cell array itself, sufficient power saving is difficult to be realized by the above method. Accordingly, it is considered to use a nonvolatile cache memory and interrupt power supply to the whole cache memory at the interruption of the power supply to a processor.

As a candidate for such a nonvolatile cache memory, attention has been given to a MRAM (Magnetic Random Access Memory) using a ferromagnetic body, a PCRAM (Phase Change Random Access Memory) using a phase change material, a ReRAM (Resistive Random Access Memory) using a material having variable resistance characteristics, or the like.

Moreover, the pamphlet of International Publication No. 2009-028298 discloses a memory that operates as a SRAM in a normal operation but is made nonvolatile as it stores data in a nonvolatile element at the interruption of power supply.

In a nonvolatile memory, stored data is retained in principle even if power supply is interrupted, but the memory has a time limit for retaining the data. For example, there is a likelihood of data being lost due to thermal disturbance in a MRAM. The time until the data is lost is called a retention time.

It is possible to increase the retention time with an improvement in resistance to thermal disturbance.

However, it is necessary to take consideration into the fact that the retention time depends on power consumed when the data is written and a time necessary for writing the data. In other words, it is necessary to write the data with large power or takes a long time to write the data to increase the retention time, which goes against power saving and speeding-up. Therefore, it is necessary to be careful about designing the retention time in the use of the nonvolatile cache memory.

When the nonvolatile cache memory is in an operation state where the power supply is enabled, the data is frequently input to and output from the memory. Therefore, it is necessary to perform the input and output of the data with respect to the nonvolatile cache memory at high speed. In addition, it is necessary to write the data with less energy for power saving. In order to meet such needs, it is desirable that the retention time of the nonvolatile cache memory be designed to be short.

On the other hand, it is necessary to retain the data inside the nonvolatile cache memory when the nonvolatile cache memory is in a standby state where the power supply is interrupted. However, because the retention time of the nonvolatile cache memory is designed to be short, there is a likelihood of the data being lost while the nonvolatile cache memory is in the standby state. This results in the inconsistency of the data between the main memory and the nonvolatile cache memory, which degrades the reliability of a computer system.

The present disclosure has been made in view of the above problems, and it is therefore desirable to enhance the reliability of data of a nonvolatile cache memory when the nonvolatile cache memory is in a standby state where power supply is interrupted.

According to an embodiment of the present disclosure, there is provided a nonvolatile cache memory including a nonvolatile memory part and a cache controller. The nonvolatile memory part is configured to store cache data. The cache controller is configured to control reading and writing of the cache data with respect to the nonvolatile memory part. Further, the cache controller is configured to perform, as a preparation for an interruption of power supply, standby preparation processing to generate standby state data and store the generated standby state data in the nonvolatile memory part. Further, the cache controller is configured to perform, at resumption of the power supply, restoration processing of the cache data stored in the nonvolatile memory part using the standby state data.

According to another embodiment of the present disclosure, there is provided a processing method of a nonvolatile cache memory having a nonvolatile memory part configured to store cache data. In the processing method, standby preparation processing is performed to generate standby state data and store the generated standby state data in the nonvolatile memory part as a preparation for an interruption of power supply. Further, restoration processing of the cache data stored in the nonvolatile memory part is performed using the standby state data at resumption of the power supply.

According to still another embodiment of the present disclosure, there is provided a computer system including a processor, a nonvolatile cache memory, a power control circuit, and a main memory. The power control circuit is configured to control power supply to the processor and the nonvolatile cache memory.

The processor is configured to perform reading and writing of data with respect to the main memory via the nonvolatile cache memory. Further, the processor is configured to transmit a standby signal requesting for shifting to a standby state to the nonvolatile cache memory when the power control circuit interrupts the power supply. Further, the processor is configured to transmit a restoration signal requesting for resuming the power supply and shifting to an operation state to the nonvolatile cache memory when the power control circuit resumes the power supply.

The nonvolatile cache memory has a nonvolatile memory part and a cache controller. The nonvolatile memory part is configured to store cache data. The cache controller is configured to control reading and writing of the cache data with respect to the nonvolatile memory part. Further, the cache controller is configured to perform, upon receiving the standby signal, standby preparation processing to generate standby state data and store the generated standby state data in the nonvolatile memory part. Further, the cache controller is configured to perform, upon receiving the restoration signal, restoration processing of the cache data stored in the nonvolatile memory part using the standby state data.

In other words, according to the embodiments of the present disclosure, the nonvolatile cache memory performs the standby preparation processing to generate standby state data and store the generated standby state data in the nonvolatile memory part at the interruption of power supply. For example, the nonvolatile cache memory stores the standby state data having error correcting data (ECC (Error Correcting Code) data) or error detecting data (EDC (Error Detecting Code) data).

Then, the nonvolatile cache memory performs the restoration processing of cache data stored in the nonvolatile memory part using the standby state data as the restoration processing at the restoration of the power supply. For example, the nonvolatile cache memory performs error correction processing or error detection processing. Thus, for example, even if the cache data is lost during the interruption of the power supply, it is possible to perform a cache operation using correct cache data after the restoration of the power supply.

According to the embodiments of the present disclosure, it is possible to enhance the reliability of the nonvolatile cache memory. This is because even if the nonvolatile cache memory loses its information in a standby state, it can retain the consistency of the information with the main memory by detecting and restoring the information.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 17 is a flowchart showing the process of shifting to the standby state according to the fourth embodiment;
and
FIG. 18 is a flowchart showing the process of restoring to the operation state according to the fourth embodiment.

DETAILED DESCRIPTION OF EMBODIMENTS

Hereinafter, embodiments of the present disclosure will be described in detail with reference to the drawings. However, the present disclosure is not limited to the following embodiments. Note that the description will be given in the following order.
(1) Basic Configuration of Embodiments
(2) First Embodiment
(3) Second Embodiment
(4) Third Embodiment
(5) Fourth Embodiment
(6) Modification (1) Basic Configuration of Embodiments FIG. 1 shows the configuration of a computer system according to the embodiments.

Figure 1:
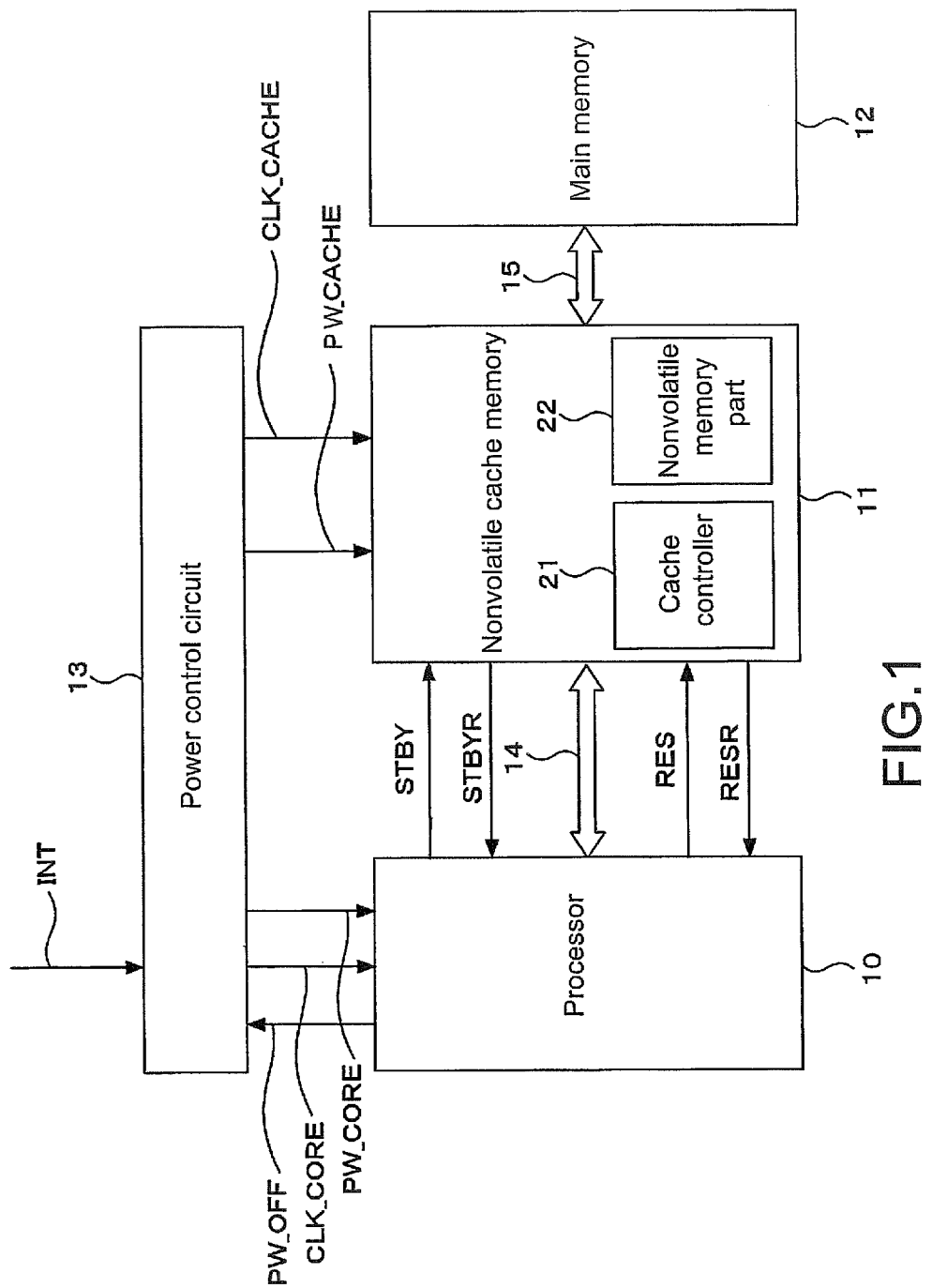
FIG. 1 is a block diagram of a computer system according to embodiments of the present disclosure.

The computer system shown in FIG. 1 has a processor 10, a nonvolatile cache memory 11, a main memory 12, a power control circuit 13, an internal bus 14, and a system bus 15.

In the computer system, the processor 10 performs the reading and writing of data with respect to the main memory 12 via the nonvolatile cache memory 11.

The nonvolatile cache memory 11 is capable of performing the input and output of data at higher speed than the main memory 12.

The power control circuit 13 controls the execution and interruption of power supply to the processor 10 and the nonvolatile cache memory 11.

First, the nonvolatile cache memory 11 will be described.

As shown in FIG. 1, the nonvolatile cache memory 11 has a cache controller 21 that manages the input and output of data and a nonvolatile memory part 22 that stores the data.

Requests for reading and writing data from the processor 10 are transmitted to the cache controller 21 via the internal bus 14.

The cache controller 21 manages the data of the nonvolatile memory part 22 in units called cache lines.

Figure 2:
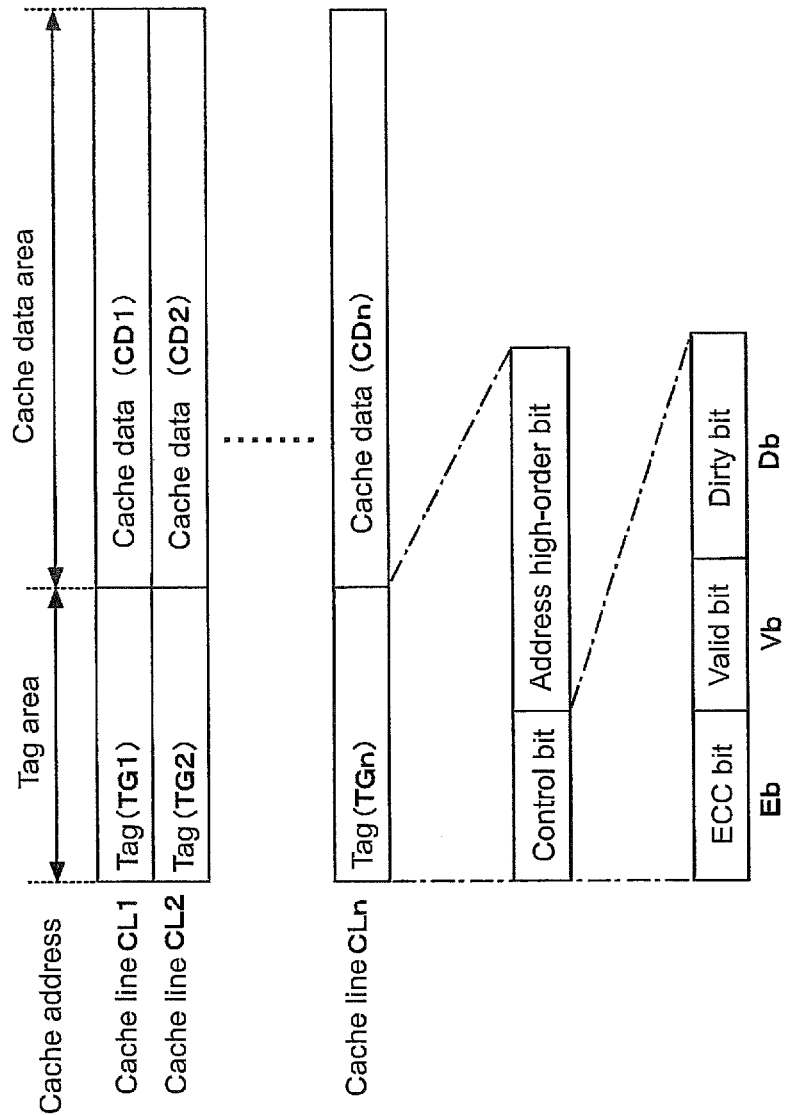
FIG. 2 is a diagram for explaining cache lines according to first and second embodiments.

FIG. 2 is a diagram showing a configuration example of the cache lines CL in fully associative mapping. Each of the cache lines CL1, CL2, CLn has a tag area and a cache data area.

In FIG. 2, tag information stored in each of the tag areas is represented as "TG," and cache data stored in each of the cache data areas is represented as "CD." A number representing each of the cache lines is added to "TG" and "CD." For example, the tag information of the cache line CL1 is represented as "TG1," and the cache data thereof is represented as "CD1." Further, the tag information of the cache line CL2 is represented as "TG2," and the cache data thereof is represented as "CD2."

As shown in FIG. 2, the cache data CD as a copy of the data of the main memory 12 is stored in each of the cache data areas.

The tag information TG is stored in each of the tag areas.

Each of the tag information TG includes address information (address high-order bits) representing the storage position of the corresponding cache data CD in the main memory 12 and a control bit representing the states of the corresponding cache line CL.

It is not necessary to store all address bits as the address information stored in each of the tag areas. For example, when each of the cache data areas has a 32-byte width, high-order bits of an address excluding low-order five bits are stored in each of the tag areas. In this sense, the address information is represented as the "address high-order bits" in FIG. 2.

The control bit stored in each of the tag areas includes an ECC bit Eb, a valid bit Vb, and a dirty bit Db.

The ECC bit Eb is a bit used when the nonvolatile cache memory 11 is in a standby state, which will be described in detail in each of the embodiments.

The valid bit Vb is a bit representing the validity of the corresponding cache line CL. When the valid bit Vb is 1, the cache controller 21 can read the cache data CD from the cache data area of the cache line CL.

The dirty bit Db is a bit representing that the corresponding cache data CD has been changed after being read. In the cache line CL whose dirty bit is 1, the cache data CD is different from the data of the main memory 12. Therefore, in releasing the cache line CL, it is necessary to write back the cache data CD to the corresponding address of the main memory 12 to keep the consistency of the data with the main memory 12.

Upon receiving the request for reading data from the processor 10, the cache controller 21 retrieves whether the corresponding valid cache data CD exists in the nonvolatile memory part 22. If the valid cache data CD exists in the nonvolatile memory part 22, the cache controller 21 reads the cache data CD from the high-speed nonvolatile memory part 22 and transmits the read cache data CD to the processor 10 via the internal bus 14.

If the valid cache data CD does not exist in the nonvolatile memory part 22, the cache controller 21 reads the corresponding cache data CD from the main memory 12 via the system bus 15. Then, the cache controller 21 transmits the read cache data CD to the processor 10 via the internal bus 14, while storing the read cache data CD in the nonvolatile memory part 22 together with its address.

Referring back to FIG. 1, the description will be continued. The power control circuit 13 controls whether clock signals and power are supplied to the processor 10 and the nonvolatile cache memory 11. The processor 10 has a power saving function with which it shifts to the standby state to interrupt the supply of the clock signals and the power to reduce power consumption, for example, when there is no command to be processed.

When shifting to the standby state, the processor 10 outputs a signal PW_OFF representing that it will shift to the standby state to the power control circuit 13.

Upon receiving the signal PW_OFF, the power control circuit 13 sets a power PW_CORE and a clock signal CLK_CORE input to the processor 10 and a power PW_CACHE and a clock signal CLK_CACHE input to the nonvolatile cache memory 11 at a low level to interrupt the supply of the clock signals and the power.

At this time, as the power supply is interrupted, internal data retained in a register or the like inside the processor 10 is lost. Therefore, it is desirable that such data be saved in the nonvolatile cache memory 11 in advance or the register itself or the like be made nonvolatile. A method of making the register itself or the like nonvolatile is disclosed in the pamphlet of International Publication No. 2009-028298.

The nonvolatile cache memory 11 stores the cache data CD in the nonvolatile memory part 22. Therefore, even if the power supply is interrupted, the cache data CD remains in the nonvolatile memory part 22 in principle.

However, there is a likelihood of the cache data CD being lost depending on the length of a standby time.

In view of the problem, in the computer system according to the embodiments, the nonvolatile cache memory 11 converts the cache lines CL into those having a data structure for use in the standby state when being in the standby state. For example, when each of the cache lines CL for the standby state has an error correcting code, original data is restored or lost data is invalidated even if the data is lost in the standby state. Thus, it is possible to keep the consistency of the data with the main memory 12.

When shifting to the standby state, the processor 10 outputs a signal STBY requesting for shifting to the standby state to the nonvolatile cache memory 11 prior to outputting to the power control circuit 13 a signal PW_OFF representing that it will shift to the standby state.

Upon receiving the signal STBY, the cache controller 21 of the nonvolatile cache memory 11 performs standby preparation processing to convert the cache lines CL inside the nonvolatile memory part 22 into those having the data structure for use in the standby state. As will be described in detail below, the cache controller 21 generates standby state data containing ECC data or EDC data and stores the generated standby state data in the nonvolatile memory part 22.

Upon completing the conversion of the cache lines CL into those having the data structure for use in the standby state, the cache controller 21 of the nonvolatile cache memory 11 outputs a signal STBYR representing that the conversion has been completed to the processor 10.

Upon receiving the signal STBYR, the processor 10 determines that the nonvolatile cache memory 11 has completed the standby preparation processing to shift to the standby state and thus outputs a signal PW_OFF to the power control circuit 13.

The subsequent operations are performed in the manner described above, and the processor 10 and the nonvolatile cache memory 11 shift to the standby state.

To terminate the standby state and restore to an operation state, a signal INT input to the power control circuit 13 from an outside can be used.

Upon receiving the signal INT, the power control circuit 13 activates the power PW_CORE and the clock signal CLK_CORE input to the processor 10 and the power PW_CACHE and the clock signal CKL_CACHE input to the nonvolatile cache memory 11 to resume the supply of the power and the clock signals.

Upon detecting the resumption of the supply of the power and the clock signal, the processor 10 outputs to the nonvolatile cache memory 11 a signal RES requesting for restoring to a normal operation.

Upon receiving the signal RES, the cache controller 21 of the nonvolatile cache memory 11 reconverts the cache lines CL inside the nonvolatile cache memory 22 into those having a data structure for use in the operation state.

Upon completing the re-conversion of the cache lines CL into those having the data structure for use in the operation state, the cache controller 21 outputs to the processor 10 a signal RESR representing that the re-conversion has been completed.

Upon receiving the signal RESR, the processor 10 determines that the nonvolatile cache memory 11 has completed preparation processing for shifting to the operation state and resumes the normal operation.

Note that the nonvolatile cache memory 11 may detect the resumption of the supply of the clock signal and the power and reconvert the cache lines CL inside the nonvolatile memory part 22 into those having the data structure for use in the operation state without receiving the signal RES.

As described above, the cache lines CL inside the nonvolatile memory part 22 have the different data structures to correspond to the operation state and the standby state.

In other words, as a preparation for the interruption of the power supply, the nonvolatile cache memory 11 performs the standby preparation processing to generate standby state data containing ECC data, EDC data, or the like and store the generated standby state data in the nonvolatile memory part 22. Thus, in the standby state after the interruption of the power supply, the nonvolatile memory part 22 is caused to have the data structure including the standby state data.

Then, at the resumption of the power supply, the nonvolatile cache memory 11 performs the restoration processing of cache data CD stored in the nonvolatile memory part 22 using the stored standby state data. As will be described below, the nonvolatile cache memory 11 performs, for example, error correction processing, error detection processing, and other necessary processing.

Thus, for example, even if information is lost in the standby state, it is possible to keep the consistency of the information with the main memory 12 by the detection and restoration of the information. That is, at least valid cache data CD is set to be consistent with the data of the main memory 12.

In other words, the nonvolatile cache memory 11 according to the first to fourth embodiments, which will be described below, have the nonvolatile memory part 22 used for storing cache data CD and the cache controller 21. The cache controller 21 controls the reading and writing of the cache data CD with respect to the nonvolatile memory part 22. Further, as a preparation for the interruption of power supply, the cache controller 21 performs the standby preparation processing to generate standby state data and store the generated standby state data in the nonvolatile memory part 22. Then, at the resumption of the power supply, the cache controller 21 performs the restoration processing of the cache data CD stored in the nonvolatile memory part 22 using the standby state data.

In the first to third embodiments, as the standby preparation processing, the cache controller 21 generates standby state data containing error correcting data (ECC data) enabling the error correction of at least cache data CD stored in the nonvolatile memory part 22 and stores the generated standby state data in the nonvolatile memory part 22. Then, as the restoration processing, the cache controller 21 performs the error correction processing of the cache data CD stored in the nonvolatile memory part 22 using the error correcting data of the standby state data.

In the fourth embodiment, as the standby preparation processing, the cache controller 21 generates standby state data containing error detecting data (EDC data) enabling the error detection of at least cache data CD stored in the nonvolatile memory part 22 and stores the generated standby state data in the nonvolatile memory part 22. Then, as the restoration processing, the cache controller 21 performs the error detection processing of the cache data CD stored in the nonvolatile memory part 22 using the error detecting data of the standby state data.

(2) First Embodiment

Next, a first embodiment will be described.

In the first embodiment, cache lines CL are configured in the manner as described in FIG. 2. The data structures of the cache lines CL are configured as shown in FIGS. 3 and 4 to correspond to an operation state (normal state where power is supplied) and a standby state (state where power supply is interrupted).

Figure 3:
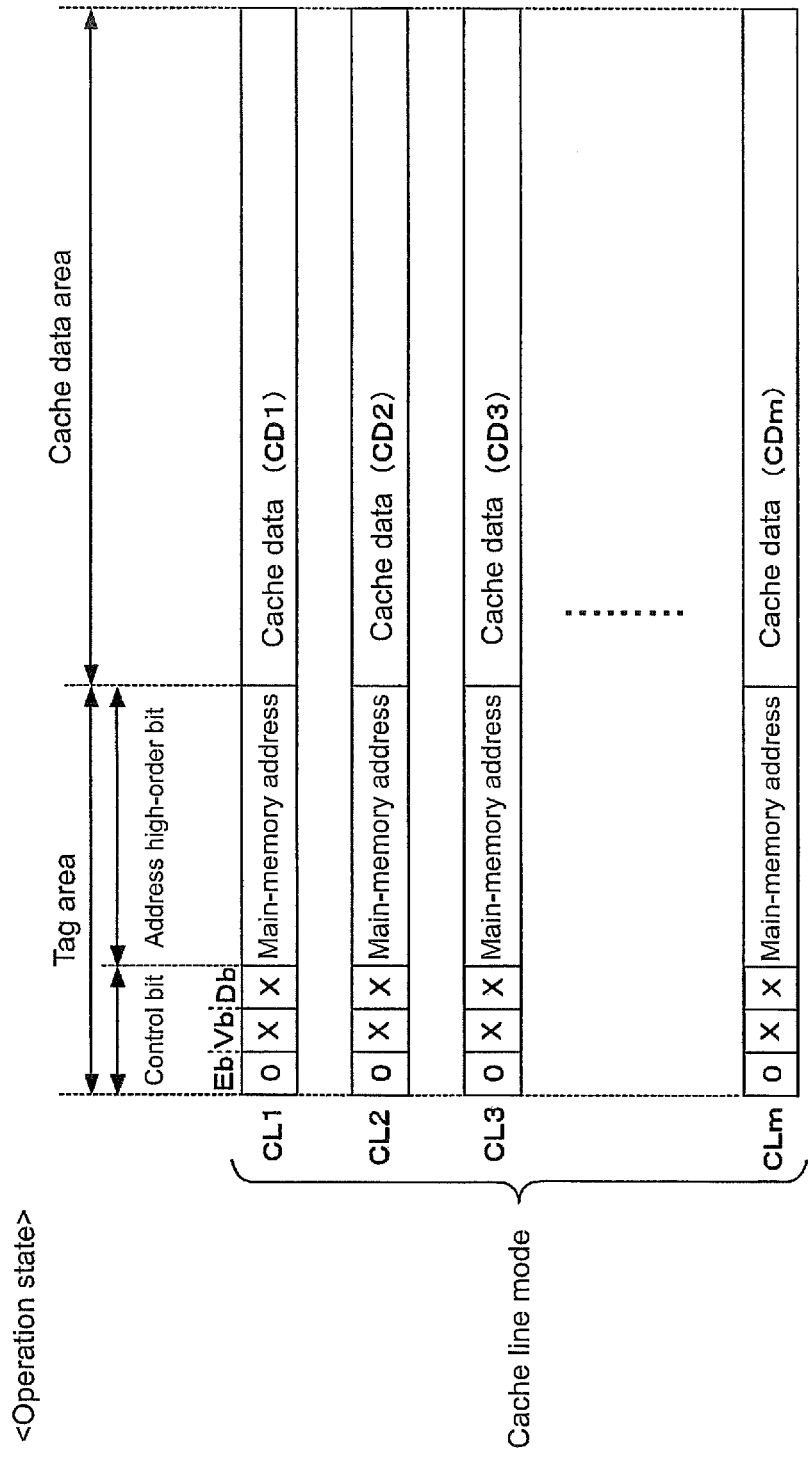
FIG. 3 is a diagram for explaining the data structure of the cache lines in an operation state according to the first embodiment.
Figure 4:
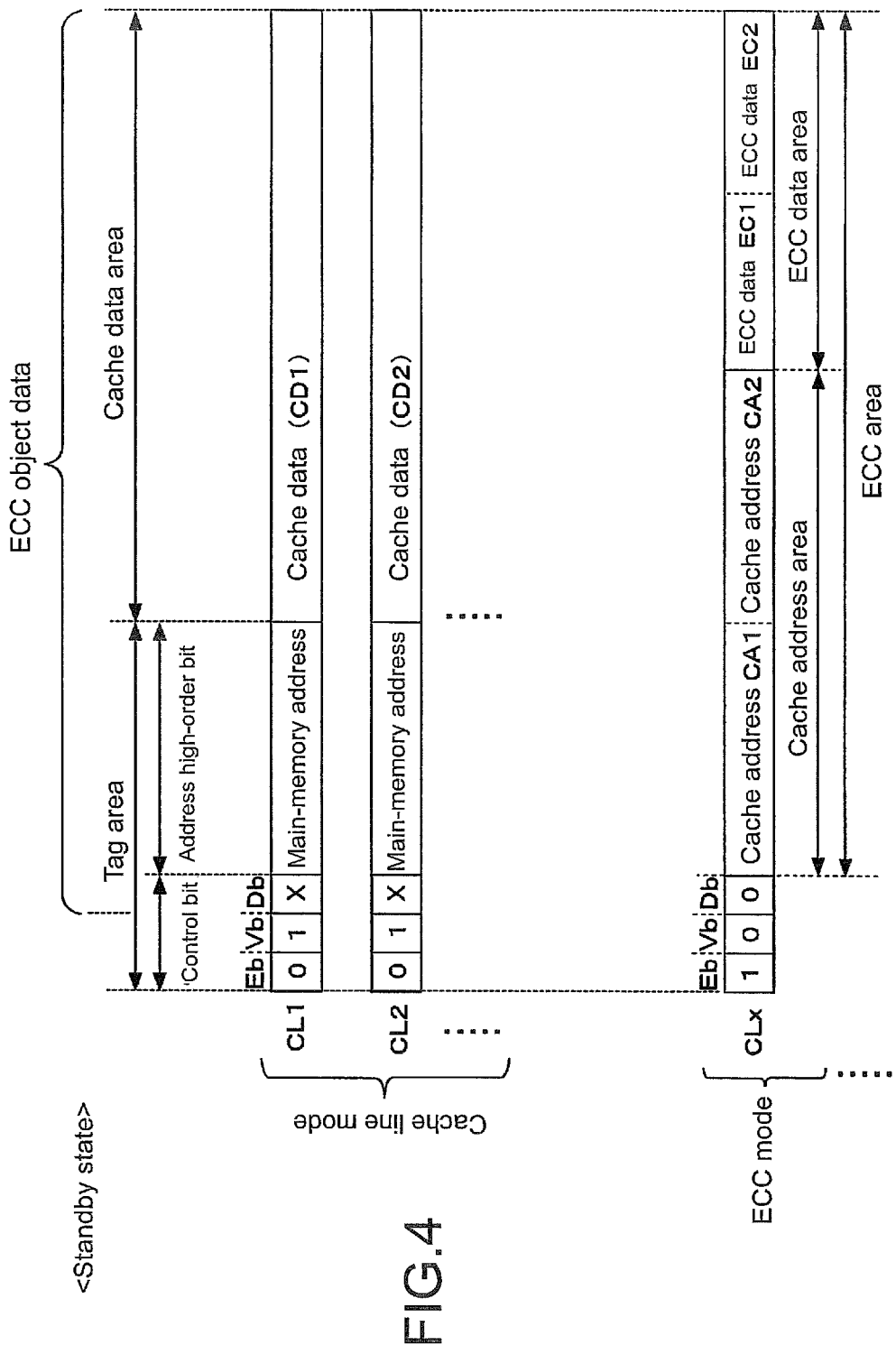
FIG. 4 is a diagram for explaining the data structure of the cache lines in a standby state according to the first embodiment.

FIG. 3 shows the cache lines CL in the operation state.

In this case, all the cache lines CL (CL1 to CLm) are in a cache line mode.

In the cache line mode, the ECC bit Eb of the control bit of each of the cache lines CL is set at "0," which represents that the cache line CL is in the cache line mode.

The valid bit Vb and the dirty bit Db of each of the cache lines CL are set according to the states of each of the cache lines CL. In FIG. 3, "x" represents "1" or "0."

The address high-order bits of each of the cache lines CL store necessary high-order bits of an address of the main memory 12 (main-memory address) serving as a reference source of cache data CD, and the cache data CD stores data corresponding to the main-memory address.

Then, when shifting from the operation state to the standby state, standby preparation processing is performed to divide the cache lines CL1 to CLm into the cache lines CL in the cache line mode and the cache lines CL in an ECC mode.

The ECC mode refers to a state where each of the cache lines CL stores standby state data.

In the standby state, the cache lines CL in the cache line mode (for example, cache lines CL1, CL2, and the like) have the same data structure as that of the cache lines CL in the operation state.

In each of the cache lines CL in the ECC mode (for example, a cache line CLx), the ECC bit Eb is set at "1," which represents that the cache line CL is in the ECC mode (i.e., which represents that the cache line CL stores ECC data as the standby state data).

In addition, in each of the cache lines CL in the ECC mode, the valid bit Vb and the dirty bit Db of the control bit of the cache line CL are set at "0."

Moreover, in each of the cache lines CL in the ECC mode, a combination of an area that stores address high-order bits and a cache data area are newly referred to as an ECC area.

The ECC area includes a cache address area that stores cache addresses CA and an ECC data area that store pieces of ECC data EC.

A method of storing data using these two modes in the standby state like this will be described in detail below.

As described above, there is a likelihood of stored data being lost during a standby time in a nonvolatile cache memory. In view of the problem, the nonvolatile cache memory 11 according to this embodiment detects lost data using an error correcting code (ECC) and corrects an error if necessary.

In the standby state, the dirty bit Db, the address high-order bits, and the cache data CD of each of the cache lines CL in the cache line mode constitute ECC object data. Then, the ECC object data is subjected to error correction coding to obtain ECC data.

Here, a combination of the ECC object data and the ECC data is an error correcting code. Of the generated error correcting code, part other than the ECC object data (ECC parity) is the ECC data.

The ECC data is stored in the ECC data area of each of the cache lines CL in the ECC mode.

At this time, the address of each of the cache lines CL (cache address CA) is stored in the cache address area to show from which of the cache lines CL the ECC data is derived.

In an example shown in FIG. 4, ECC data EC1 corresponding to the ECC object data of the cache line CL1 and a cache address CA1 representing the cache line CL1 are stored in the cache line CLx different from the cache line CL1.

Further, ECC data EC2 corresponding to the ECC object data of the cache line CL2 and a cache address CA2 representing the cache line CL2 are also stored in the cache line CLx.

In this case, the number of total bits of the cache addresses CA and pieces of the ECC data EC is set to be less than the number of bits of the ECC area.

Therefore, each of the ECC areas can store cache addresses CA and pieces of ECC data EC in pairs.

FIG. 4 shows, as an example, a case where two pairs of cache addresses CA and pieces of ECC data EC are stored. However, the number of pairs of cache addresses CA and pieces of ECC data EC is not limited to two. For example, one or three or more pairs of cache addresses CA and pieces of ECC data EC may be stored.

Next, a method of allocating the cache lines CL to the cache line mode and the ECC mode will be described.

In the cache line mode, valid cache lines CL whose valid bit is 1 are typically targeted. This is because it is not necessary to retain cache lines CL whose valid bit is 0, i.e., invalid cache lines CL in the standby state.

Basically, the invalid cache lines CL whose valid bit is 0 are allocated to the ECC mode.

However, if the number of the cache lines CL to be allocated to the ECC mode is greater than the number of the invalid cache lines CL, areas that store pieces of the ECC data EC corresponding to all the valid cache lines CL become insufficient. Therefore, the valid cache lines CL are selected appropriately and allocated to the ECC mode. In this case, the valid bits Vb of the valid cache lines CL to be allocated to the ECC mode are set at "0" for invalidation.

In selecting the cache lines CL from among the valid cache lines CL, various line replacement methods used in normal cache memories can be used.

For example, a round robin method, a LRU (Least Recently Used) method, a random method, or the like is available.

Based on the selection described above, the ECC bits Eb and the valid bits Vb of the cache lines CL in the cache line mode become "0" and "1," respectively, while the ECC bits Eb and the valid bits Vb of the cache lines CL in the ECC mode become "1" and "0," respectively.

Here, it is necessary to take consideration into the fact that an error may also occur in the ECC bits Eb and the valid bits Vb in the standby state. When the ECC bits Eb of the cache lines CL in the cache line mode are changed to "1" in the standby state, both the ECC bits Eb and the valid bits Vb become "1."

Because such the cache lines CL are neither in the cache line mode nor in the ECC mode, they are invalidated.

Similarly, the cache lines CL are also invalidated when the valid bits Vb of the cache lines CL in the cache line mode become "0," the ECC bits Eb of the cache lines CL in the ECC mode become "0," and the valid bits Vb of the cache lines CL in the ECC mode become "1."

Thus, even if an error occurs in the ECC bits Eb and the valid bits Vb not protected by error correction, it is possible to prevent a malfunction from occurring.

When shifting from the standby state to the operation state with the resumption of the power supply, the cache line CL having the same cache address CA as that of the cache line CL in the cache line mode is selected from those in the ECC mode to acquire the ECC data EC.

Then, the ECC object data and the ECC data EC are combined together to constitute an error correcting code to perform error correction. If necessary, correct data is written in the ECC object data. Depending on the circumstances, the cache line CL in the ECC mode having the same cache address CA may not be found due to an error occurring in the ECC bit Eb and the valid bit Vb. In such a case, because error correction is difficult to be performed, the cache line CL is invalidated.

Next, processing performed by the cache controller 21 in this embodiment will be described.

Figure 5:
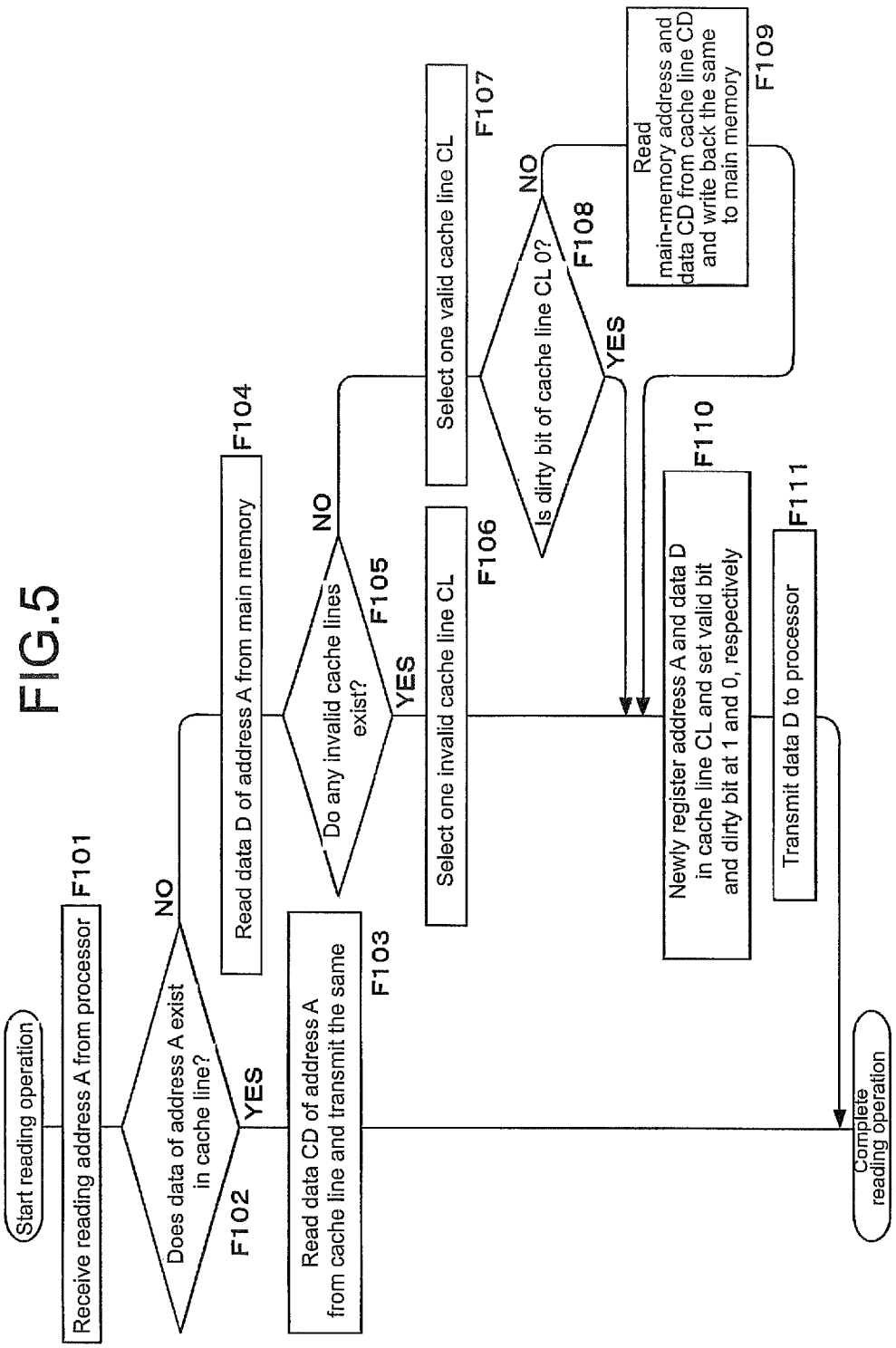
FIG. 5 is a flowchart showing a reading operation according to the first embodiment.

First, FIG. 5 shows a processing example in a case where the cache controller 11 receives a request for reading data from the processor 10 in the normal operation state.

Upon receiving the request for reading an address A from the processor 10 in step F101, the cache controller 21 determines in step F102 whether a valid cache line CL corresponding to the address A exists in the nonvolatile memory part 22. That is, the cache controller 21 determines whether the cache line CL whose valid bit Vb is "1" and where the address A is stored as a main-memory address exists.

If the valid cache line CL exists, the cache controller 21 proceeds to step F103. In step F103, the cache controller 21 acquires cache data CD from the cache line CL and transmits the acquired cache data CD to the processor 10.

That is, in this case, the cache controller 21 transfers, as so-called cache hit transfer, the data of the address A to the processor 10 without accessing the main memory 12.

On the other hand, if the valid cache line CL corresponding to the address A does not exist, the cache controller 21 proceeds to step F104. In step F104, the cache controller 21 reads the data D of the address A from the main memory 12.

Then, in step F105, the cache controller 21 determines whether any invalid cache lines CL exist to store the data D read from the main memory 12 in the nonvolatile memory part 22.

If the invalid cache lines CL exist, the cache controller 21 selects one of the invalid cache lines CL in step F106.

Next, in step F110, the cache controller 21 newly registers the data D read from the main memory 12 and the address A in the selected cache line CL. That is, the cache controller 21 stores the data D as the cache data CD and the address A as the main-memory address in the selected cache line CL.

Further, because the cache line CL becomes a new and valid cache line, the cache controller 21 sets the valid bit Vb and the dirty bit Db of the cache line CL at "1" and "0," respectively.

Then, in step F111, the cache controller 21 transmits the data D to the processor 10.

That is, in this case, because no cache hit is produced, the cache controller 21 transfers the data D read from the main memory 12 to the processor 10. Further, the cache controller 21 stores the data D read from the main memory 12 in the certain cache line CL as the cache data CD.

On the other hand, if it is determined in step F105 that no invalid cache lines CL exist, the cache controller 21 proceeds to step F107. In step F107, the cache controller 21 selects one of valid cache lines CL.

Next, in step F108, the cache controller 21 determines whether the dirty bit Db of the selected cache line CL is "0."

If the dirty bit Db of the selected cache line CL is "0," the cache controller 21 proceeds to steps F110 and F111. In steps F110 and F111, the cache controller 21 newly registers the data D in the cache line CL and transmits the registered data D to the processor 10.

In this case, the cache controller 21 deletes cache data CD registered in the certain valid cache line CL and newly stores the data D read from the main memory 12 therein as the cache data CD.

Further, if it is determined in step F108 that the dirty bit Db of the selected cache line CL is "1", the cache controller 21 performs the processing of step F109. In this case, the cache data CD of the cache line CL is different from the data D of the address A read from the main memory 12. Therefore, the cache controller 21 reads the cache data CD and the main-memory address from the cache line CL and writes back the read cache data CD and the main-memory address to the main memory 12.

Thus, the cache controller 21 reflects the update of the cache data CD on the data of the address A in the main memory 12.

After that, the cache controller 21 performs the processing of steps F110 and F111.

Figure 6:
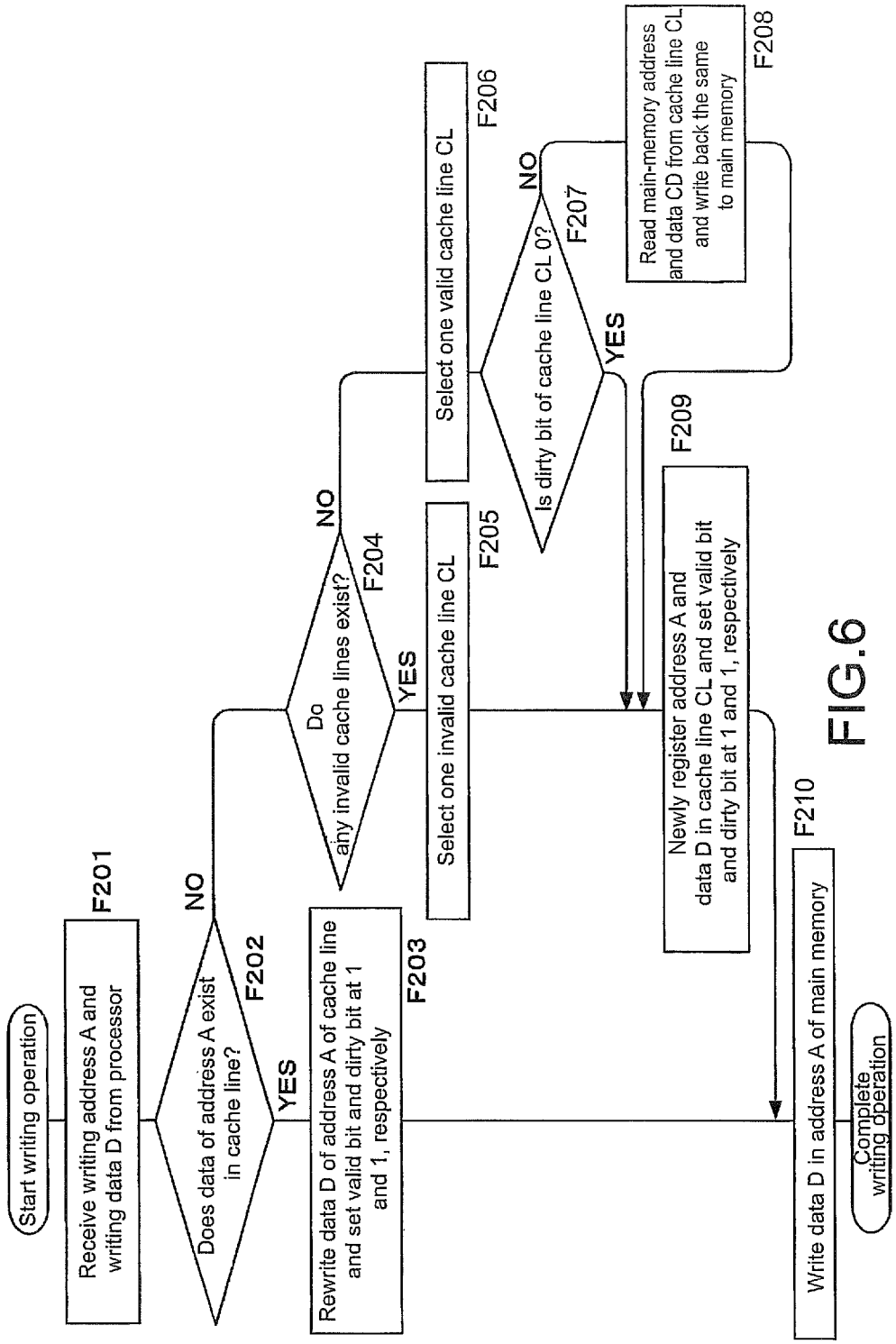
FIG. 6 is a flowchart showing a writing operation according to the first embodiment.

Next, FIG. 6 shows a processing example in a case where the cache controller 21 receives a request for writing data from the processor 10 in the normal operation state.

In step F201, the cache controller 21 receives the request for writing the data D in an address A from the processor 10.

First, in step F202, the cache controller 21 determines whether a valid cache line CL corresponding to the address A exists in the nonvolatile memory part 22.

If the valid cache line CL exists in the nonvolatile memory part 22, the cache controller 21 rewrites the cache data CD of the cache line CL into the data D supplied from the processor 10 in step F203. That is, the cache controller 21 updates the cache data CD of the cache line CL. Further, with the update of the cache data CD, the cache controller 21 sets the dirty bit Db and the valid bit Vb of the cache line CL at "1" and "1," respectively.

Then, in step F210, the cache controller 21 writes the data D in the address A of the main memory 12.

However, it is not necessary to update the data of the main memory 12 every time a cache line CL is updated. For example, if the update of the data of the main memory 12 is to be performed at a subsequent certain stage, it is not necessary to perform the writing of the data in step F210.

Further, when the update data of the cache data CD is reflected on the main memory 12 in step F210, the cache controller 21 restores the dirty bit Db of the cache line CL to "0."

If it is determined in step F202 that no valid cache line CL corresponding to the address A exists in the nonvolatile memory part 22, the cache controller 21 proceeds to step F204. In step F204, the cache controller 21 determines whether any invalid cache lines CL exist to store the data D in the nonvolatile memory part 22.

If the invalid cache lines CL exist, the cache controller 21 selects one of the invalid cache lines CL in step F205.

Next, in step F209, the cache controller 21 newly registers the address A and the data D in the selected cache line CL. That is, the cache controller 21 stores the data D as the cache data CD and the address A as the main-memory address in the selected cache line CL.

Further, because the cache line CL becomes a new and valid cache line, the cache controller 21 sets the valid bit Vb of the cache line CL at "1." Further, because the new data D (cache data CD) does not correspond to the data of the address A of the main memory 12 at this stage, the cache controller 21 sets the dirty bit Db of the cache line CL at "1."

Then, in step F210, the cache controller 21 writes the data D in the address A of the main memory 12. In this case, the cache controller 21 restores the dirty bit Db of the cache line CL to "0."

Alternatively, the cache controller 21 may not perform the processing of step F210 at this stage.

If it is determined in step F204 that no invalid cache lines CL exist, the cache controller 21 selects one of valid cache lines CL in step F206.

Next, in step F207, the cache controller 21 determines whether the dirty bit Db of the selected valid cache line CL is "0."

If it is determined in step F207 that the dirty bit Db of the selected valid cache line CL is "0," the cache controller 21 newly registers the data CD in the cache line CL as it is in step F209. Further, in step F210, the cache controller 21 writes the data CD in the main memory 12 (or may not write the data CD at this stage).

In this case, the cache controller 21 deletes cache data CD registered in the certain valid cache line CL and newly registers the written data D therein as the cache data CD.

Further, if it is determined in step F207 that the dirty bit Db of the selected cache line CL is "1," the cache controller 21 performs the processing of step F208. In this case, the cache data CD is different from the data D of the address A read from the main memory 12. Therefore, the cache controller 21 reads the cache data CD and the main-memory address from the cache line CL and writes back the read cache data CD and the main-memory address to the address A in the main memory 12.

Thus, the cache controller 21 reflects the update of the cache data CD on the data of the address A in the main memory 12.

After that, the cache controller 21 performs the processing of steps F209 (and F210).

Figure 7:
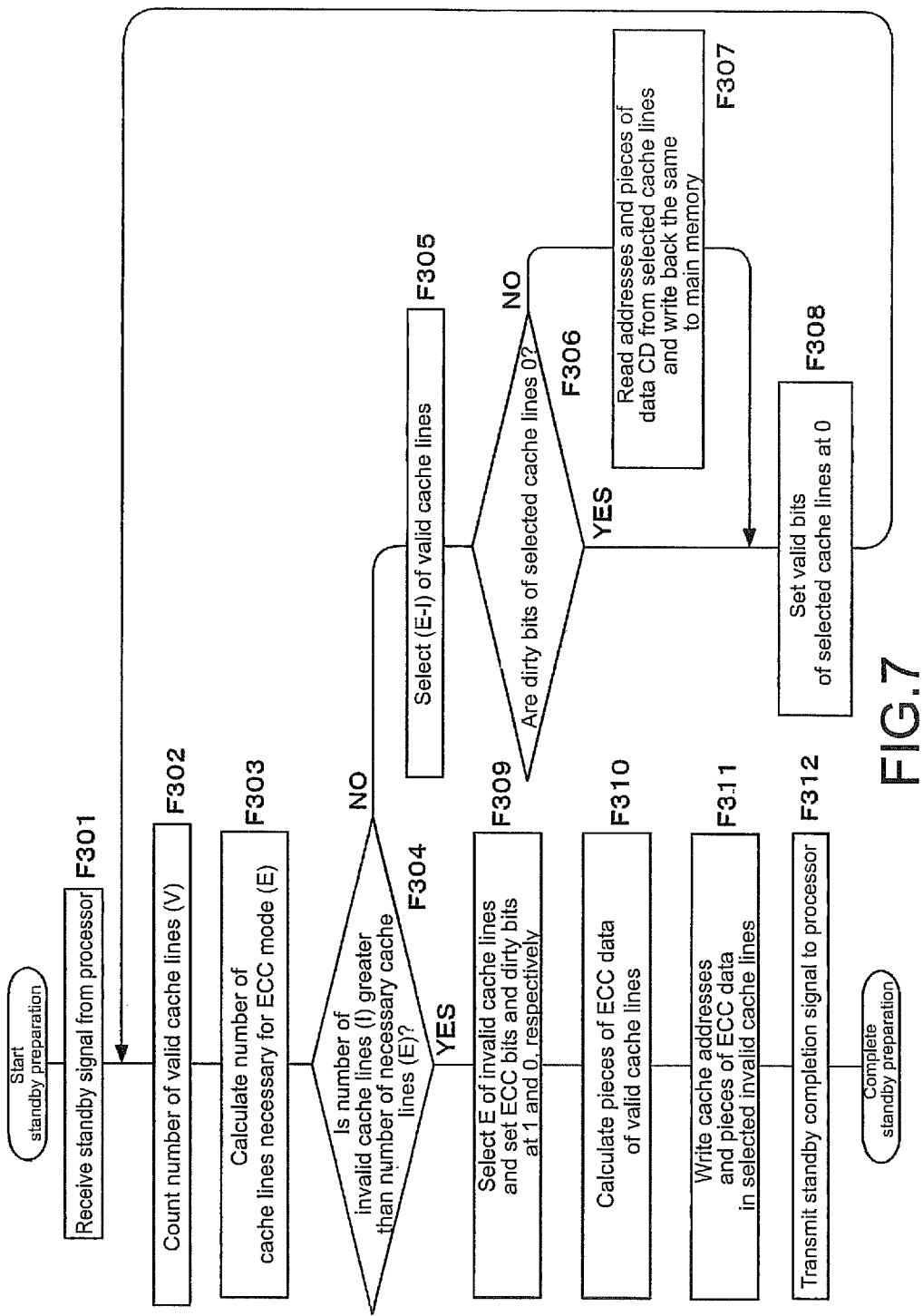
FIG. 7 is a flowchart showing the process of shifting to the standby state according to the first embodiment.

Next, FIG. 7 shows a processing example in a case where the cache controller 21 receives a standby signal from the processor 10 in the process of shifting from the normal operation state to the standby state, i.e., an example of the standby preparation processing of the cache controller 21.

In step F301, the cache controller 21 receives a standby signal from the processor 10.

First, in step F302, the cache controller 21 counts the number of valid cache lines CL in the nonvolatile memory part 22. In other words, the cache controller 21 counts the number of cache lines CL whose valid bit Vb is "1." The cache controller 21 counts the number as the number of the valid cache lines (V).

Next, in step F303, the cache controller 21 calculates the number of cache lines CL necessary for the ECC mode. The number of the necessary cache lines CL is represented as E.

If there is employed a data structure where pieces of ECC data EC and cache addresses CA of two cache lines CL are stored in one cache line CL in the ECC mode as shown in the example of FIG. 4, the relationship E=V/2 is established.

Then, in step F304, the cache controller 21 determines whether the number of invalid cache lines CL (I) is greater than the number of the necessary cache lines CL (E).

The number of the invalid cache lines CL (I) is calculated as follows:

$$I = \text{(the number of total cache lines CL)} - V$$

Where the relationship I≥E is established, the cache lines CL in the ECC mode can be formed using the invalid cache lines CL (I).

Next, the cache controller 21 proceeds to step F309. In step F309, the cache controller 21 selects E of the invalid cache lines CL (I).

The cache controller 21 sets all the ECC bits Eb and the dirty bits Db of the selected E cache lines CL at "1" and "0," respectively.

In step F310, the cache controller 21 calculates pieces of ECC data EC for each of the valid cache lines CL (V).

For example, when cache lines CL1, CL2, CL5, CL6, CL7, and CL10 exist as the valid cache lines CL, the cache controller 21 calculates pieces of ECC data EC1, EC2, EC5, EC6, EC7, and EC10 of the cache lines CL1, CL2, CL5, CL6, CL7, and CL10.

Then, in step F311, the cache controller 21 writes cache addresses CA and pieces of the ECC data EC in the cache lines CL selected in step F309.

For example, it is assumed that cache lines CL15, CL16, and CL17 are selected for use in the ECC mode. In this case, the cache controller 21 writes, for example, pieces of the ECC data EC1 and EC2 corresponding to the cache lines CL1 and CL2 and cache addresses CA1 and CA2 in the cache line CL15. Further, the cache controller 21 writes pieces of the ECC data EC5 and EC6 corresponding to the cache lines CL5 and CL6 and cache addresses CA5 and CA6 in the cache line CL16. Further, the cache controller 21 writes pieces of the ECC data EC7 and EC10 corresponding to the cache lines CL7 and CL10 and cache addresses CA7 and CA10 in the cache line CL17.

Thus, the cache controller 21 converts the cache lines CL15, CL16, and CL17 into those having a data structure for use in the ECC mode.

The cache controller 21 completes the standby preparation processing in the nonvolatile memory part 22 as described above. Accordingly, the cache controller 21 transmits a standby completion signal to the processor 10 in step F312 to complete a series of the processing.

Meanwhile, if it is determined in step F304 that the number of the invalid cache lines CL (I) is less than the number of the necessary cache lines CL (E), it becomes insufficient to use only the invalid cache lines CL (I).

In this case, the cache controller 21 proceeds to step F305.

First, in step F305, the cache controller 21 selects (E-I) of the valid cache lines CL.

Then, in step F306, the cache controller 21 determines whether the dirty bits Db of the selected (E-I) cache lines CL are "0."

If it is determined in step F306 that the dirty bits Db of all the (E-I) cache lines CL are "0," the cache controller 21 directly proceeds to step F308. In step F308, the cache controller 21 sets the valid bits Vb of the selected cache lines CL at "0." That is, the cache controller 21 invalidates the valid bits Vb of the selected cache lines CL. Because the cache lines CL are only areas that store caches in the computer system shown in FIG. 1, there is no problem with the invalidation of the valid cache lines CL (deletion of the cache data CD). This is because only some of the caches are deleted.

Next, the cache controller 21 performs the processing of steps F302 and F303 again. If the number of the invalid cache lines CL (I) becomes greater than the number of the necessary cache lines CL (E) in step F304, the cache controller 21 performs the processing of steps F309 to F312.

Further, if it is determined in step F306 that some of the cache lines CL whose dirty bit Db is "1" exist among the selected (E-I) cache lines CL, the cache controller 21 performs the processing of step F307. In this case, pieces of the cache data CD of the cache lines CL whose dirty bit Db is "1" among the selected cache lines CL are different from pieces of the data of the main memory 12. Therefore, the cache controller 21 reads pieces of the cache data CD and the main-memory addresses from the cache lines CL and writes back pieces of the read cache data CD and the main-memory addresses to the main memory 12.

Thus, the cache controller 21 reflects the update of pieces of the cache data CD on pieces of the data of the main memory 12.

After that, the cache controller 21 performs the processing of steps F302 and F303 again via the processing of step F308. Then, if the number of the invalid cache lines CL (I) becomes greater than the number of the necessary cache lines CL (E) in step F304, the cache controller 21 performs the processing of steps F309 to F312.

Note that the number of the valid cache lines CL (V) selected in step F305 (i.e., the number of the cache lines CL to be invalidated) is a fixed value like one or two, and the processing may be repeatedly performed to obtain the positive result in step F304 at a certain stage.

Figure 8:
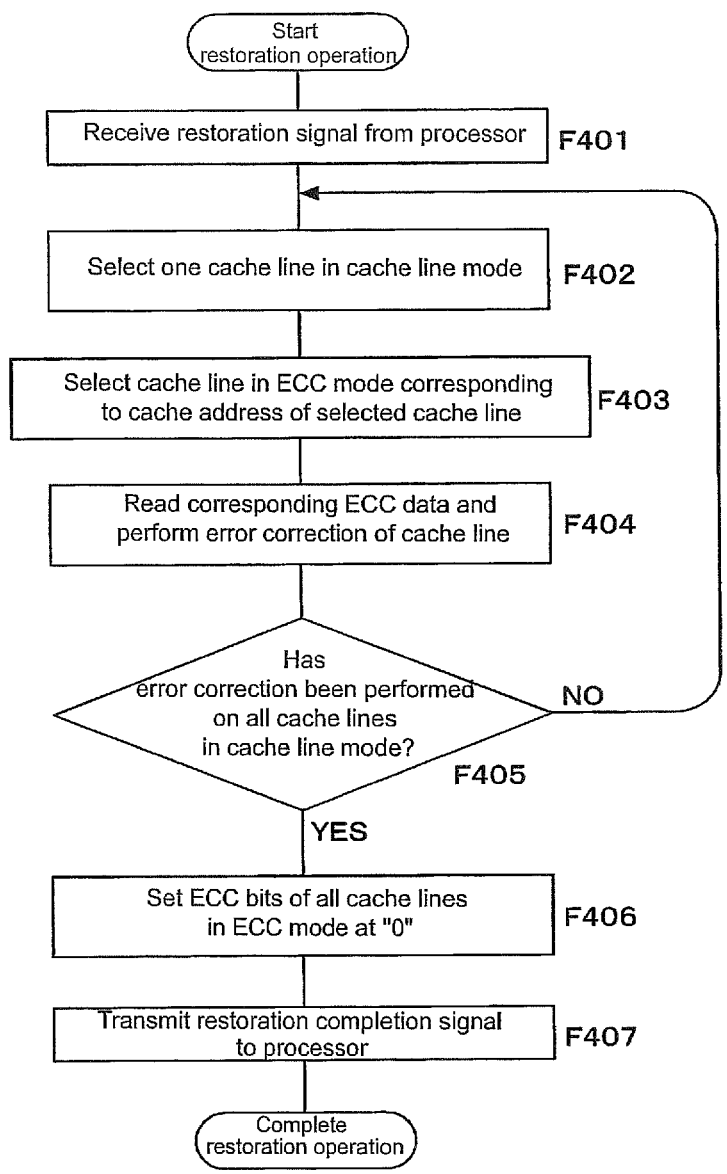
FIG. 8 is a flowchart showing the process of restoring to the operation state according to the first embodiment.

Next, FIG. 8 shows a processing example in a case where the cache controller 21 receives a restoration signal from the processor 10 in the process of shifting from the standby state to the operation state, i.e., an example of the restoration processing of the cache controller 21.

In step F401, the cache controller 21 receives a restoration signal from the processor 10.

In step F402, the cache controller 21 selects one of cache lines CL in the cache line mode from the nonvolatile memory part 22.

In step F403, the cache controller 21 selects a cache line CL in the ECC mode where the cache address CA of the selected cache line CL is stored.

In step F404, the cache controller 21 reads ECC data EC corresponding to the cache line CL in the cache line mode selected in step F402 from the cache line CL in the ECC mode selected in step F403 to perform the error correction processing of the cache line CL in the cache line mode.

For example, when applied to the state shown in FIG. 4, the processing described above is performed as follows.

The cache controller 21 selects the cache line CL1 in step F402 and then selects the cache line CLx in the ECC mode that stores the cache address CA1 representing the cache line CL1 in step F403. Next, in step F404, the cache controller 21 reads the ECC data EC1 stored in the cache line CLx and performs the error correction processing of the ECC object data of the cache line CL1 using the ECC data EC1.

In step F405, the cache controller 21 determines whether the error correction processing of steps F402 to F404 has been performed on all the cache lines CL in the cache line mode. If not, the cache controller 21 returns to step F402 to perform the processing of steps F402 to F404 on the remaining cache lines CL in the cache line mode. In the case of the example shown in FIG. 4, the cache controller 21 next performs the error correction processing of the cache line CL2 in the same manner.

When the error correction processing of steps F402 to F404 has been performed on all the cache lines CL in the cache line mode, the cache controller 21 proceeds to step F406. In step F406, the cache controller 21 sets the ECC bits Eb of all the cache lines CL in the ECC mode at "0" to merely become invalid cache lines CL.

Then, in step F407, the cache controller 21 transmits a restoration completion signal to the processor 10 to complete a series of the processing.

As described above, in the first embodiment, the nonvolatile memory part 22 has a plurality of cache lines CL each used for storing cache data CD. As the standby preparation processing, the cache controller 21 generates for at least some of the cache lines CL pieces of standby state data each containing error correcting data (ECC data EC) enabling the error correction of the cache data CD stored in each of the cache lines CL, stores pieces of the standby state data in another of the cache lines CL (cache lines CL in the ECC mode), and brings the other cache lines CL into the state representing that they store the standby state data (sets the ECC bits Eb at "1").

The standby state data containing pieces of the error correcting data further contains pieces of address information CA of the cache lines CL each storing the cache data CD on which error correction is performed using the error correcting data.

In the first embodiment, the cache controller 21 calculates pieces of ECC data EC of valid cache lines CL before shifting to the standby state and stores pieces of the ECC data EC in invalid cache lines CL. Accordingly, it is possible to correct data in a restoration operation even if the data is lost in the standby state.

Note that the processing of step F406 may not be performed. That is, the cache lines CL in the ECC mode may remain as they are for a certain time. For example, the cache lines CL in the ECC mode remain until the cache lines CL run short in a normal cache operation, and may be used as occasion demands.

Thus, if the cache lines CL in the ECC mode remain like this, there is a likelihood of obtaining the existence of the cache lines CL that may be subjected to error correction at its restoration time when the standby preparation processing is difficult to be performed, in the case of the momentary interruption of power supply or the like.

(3) Second Embodiment

Next, a second embodiment will be described. Note that descriptions of the same parts as those of the first embodiment will be omitted.

The second embodiment refers to an example where the cache controller 21 stores ECC data EC serving as standby state data in an area corresponding to a cache line CL storing cache data CD as an object of the standby state data.

As in the first embodiment, the cache lines CL in the second embodiment are configured in the manner as shown in FIG. 2. Further, the data structures of the cache lines CL are configured as shown in FIGS. 3 and 9 to correspond to an operation state and a standby state.

The second embodiment is the same as the first embodiment in that all the cache lines CL enter a cache line mode as shown in FIG. 3 when being in the operation state.

In addition, the second embodiment is the same as the first embodiment in that the cache lines CL are divided into cache lines CL in the cache line mode and cache lines CL in an ECC mode in the process of shifting from the operation state to the standby state.

Figure 9:
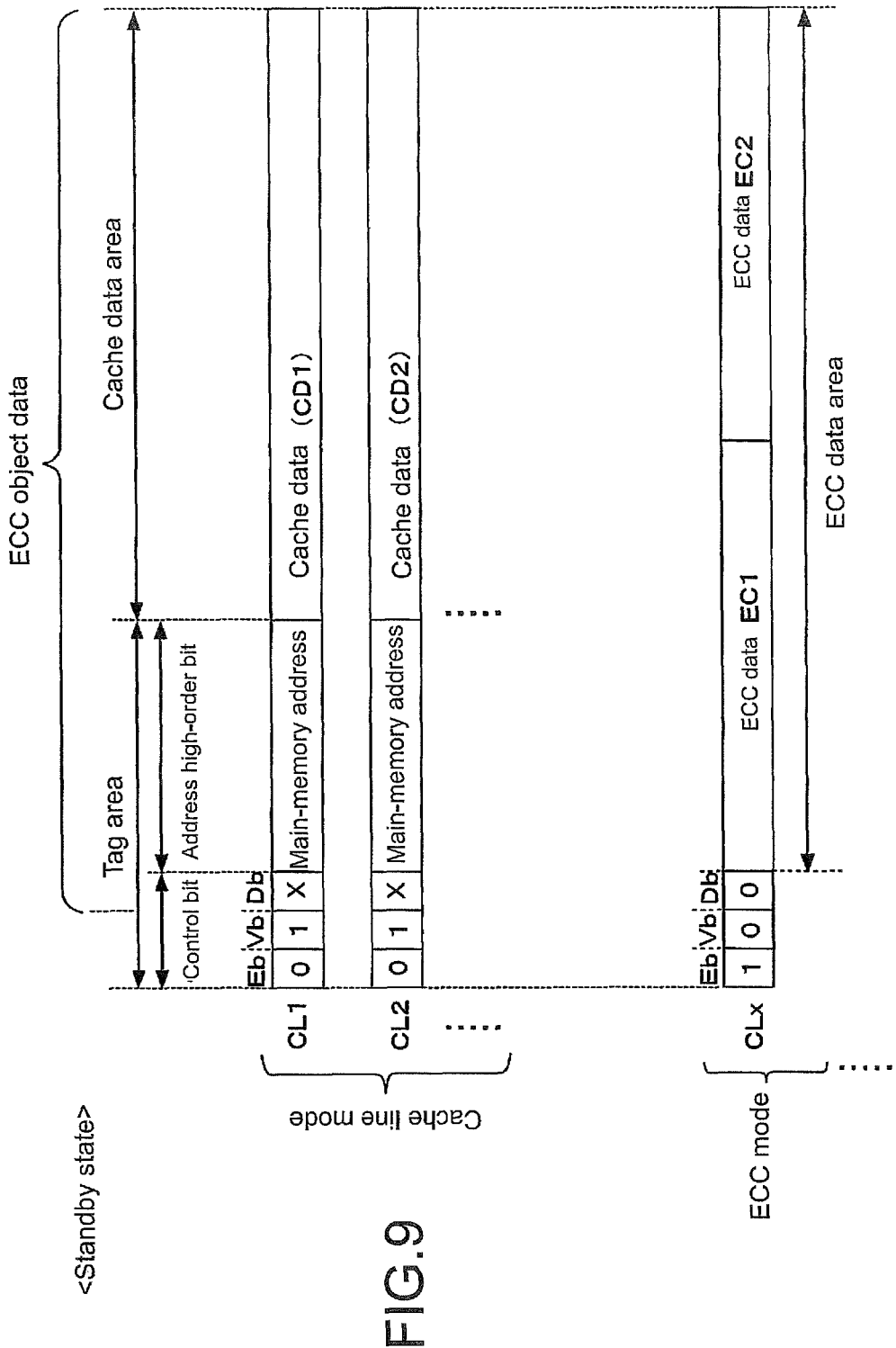
FIG. 9 is a diagram for explaining the data structure of the cache lines in the standby state according to the second embodiment.

In the second embodiment, an area other than the area of a control bit is set as an ECC data area in each of the cache lines CL in the ECC mode as shown in FIG. 9. That is, it is clear from the comparison between FIGS. 4 and 9 that each of the cache lines CL in the ECC mode has no cache address area as shown in FIG. 9.

Note that the functions of the ECC data area and the method of configuring the control bit are the same as those of the first embodiment.

As described above, each of the cache lines CL in the ECC mode has no cache address area in the second embodiment. Therefore, the ECC data areas are made to correspond to the cache lines CL in the following manner.

Figure 10:
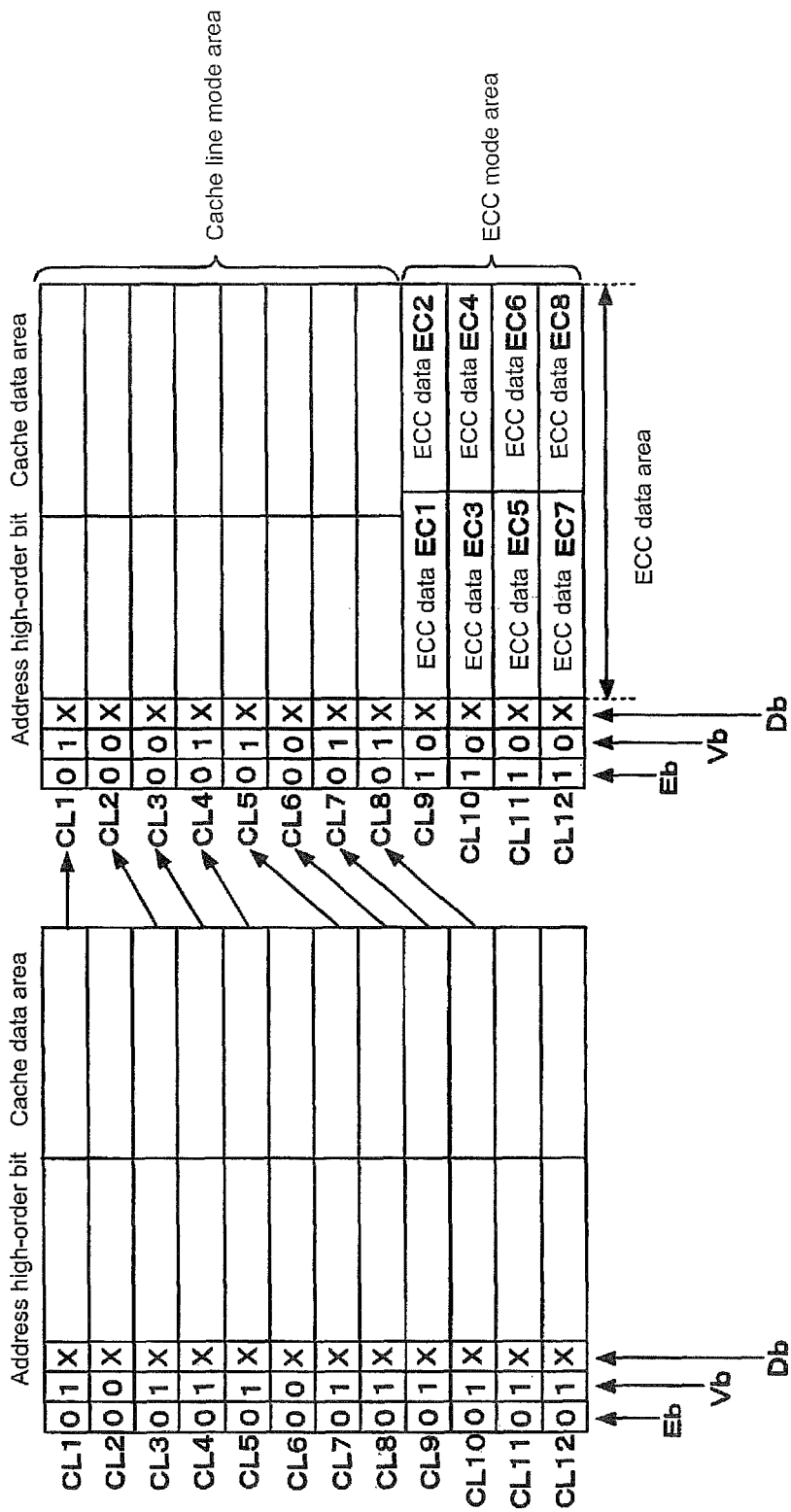
FIG. 10 is a diagram for explaining sorting of the cache lines in the process of shifting to the standby state according to the second embodiment.

FIG. 10 is a diagram showing sorting of the cache lines CL in the process of shifting to the standby state.

In the operation state, valid cache lines CL (valid bit Vb=1) and invalid cache lines CL (valid bit Vb=0) exist together.

In the process of shifting to the standby state, the valid cache lines CL are sorted in the order of cache addresses CA (in the order from a cache line CL1 to a cache line CL8).

An area where the valid cache lines CL (cache lines CL1 to CL8) are sorted is referred to as a cache line mode area.

Further, the invalid cache lines CL (cache lines CL9 to CL12) are sorted subsequent to the valid cache lines CL1 to CL8. An area where the invalid cache lines CL9 to CL12 are sorted is referred to as an ECC mode area.

Here, the positions of the cache lines CL are made to correspond to the positions of the ECC data EC one to one such that ECC data EC1 corresponding to the cache line CL1 is positioned in the first half of the cache line CL9, ECC data EC2 corresponding to the cache line CL2 is positioned in the second half of the cache line CL9, ECC data EC3 corresponding to the cache line CL3 is positioned in the first half of the cache line CL10, and the like.

Thus, it is not necessary to store the cache addresses CA in the cache lines CL in the ECC mode.

Note that each of the cache lines CL stores two ECC data EC in this example, but may store one or three or more pieces of ECC data EC.

Where the total number of the cache lines CL is represented as T and the number of pieces of the ECC data EC allowed to be stored in each of the cache lines CL is represented as N, the number of the cache lines CL (C) in the cache line mode area meets the relationship C+C/N=T. In other words, the relationship C=NT/(N+1) is established.

Because the number of pieces of the ECC data EC allowed to be stored in each of the cache lines CL is two (i.e., N=2) and the total number of the cache lines CL is 12 (i.e., T=12) in the example shown in FIG. 10, the number of the cache lines CL in the cache line mode area is eight (i.e., C=8). At this time, the cache lines CL1 to CL8 are allocated to the cache line mode area, while the cache lines CL9 to CL12 are allocated to the ECC mode area.

Figure 11:
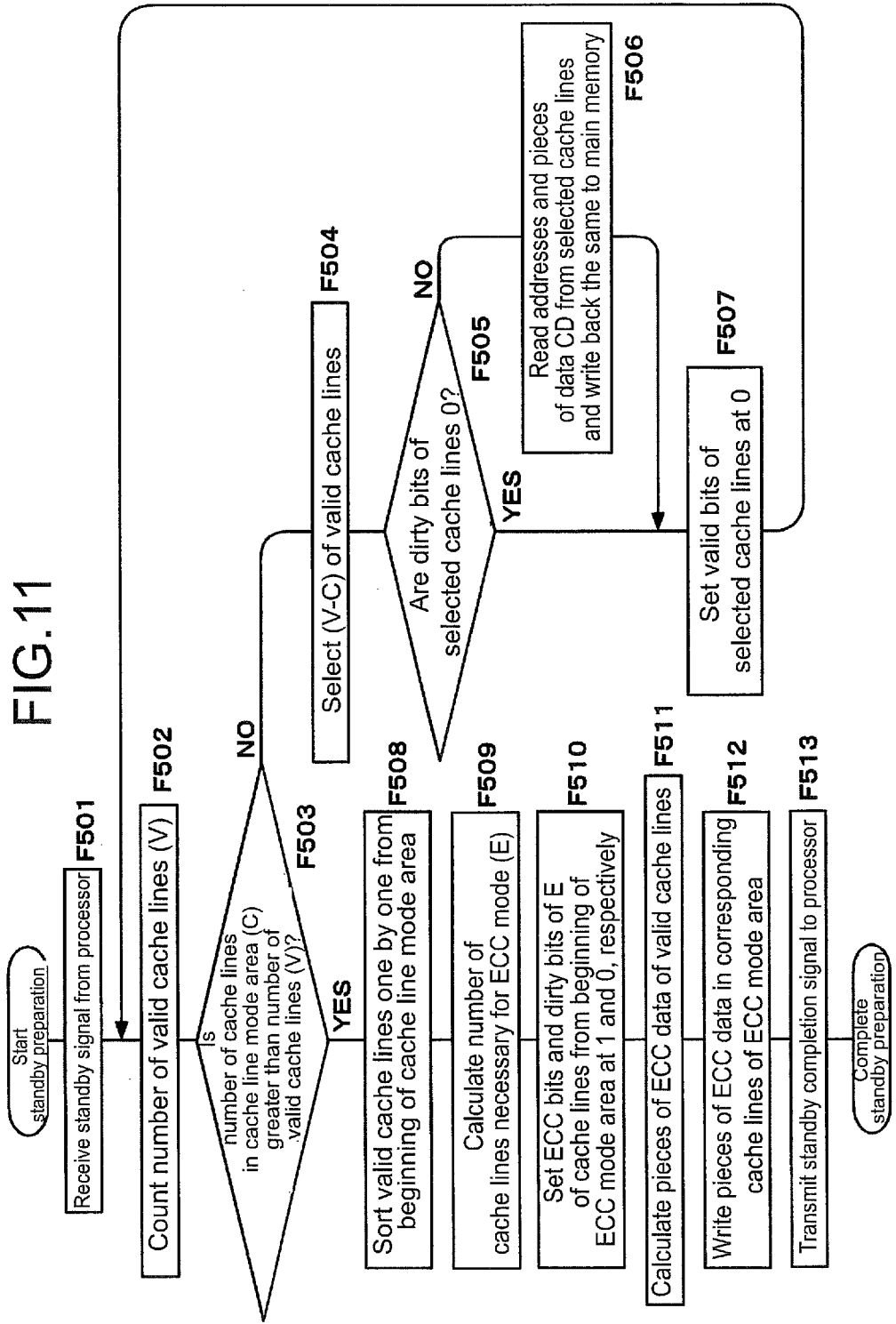
FIG. 11 is a flowchart showing the process of shifting to the standby state according to the second embodiment.

FIG. 11 is a flowchart showing standby preparation processing in the second embodiment.

In step F501, the cache controller 21 receives a standby signal from the processor 10.

Then, in step F502, the cache controller 21 counts the number of valid cache lines CL in the nonvolatile memory part 22. In other words, the cache controller 21 counts the number of cache lines CL whose valid bit is "1." The cache controller 21 counts the number as the number of the valid cache lines CL (V).

Next, in step F503, the cache controller 21 determines whether the number of the cache lines CL in the cache line mode area (C) is greater than the number of the valid cache lines CL (V).

If the relationship C≥V is established, the cache controller 21 proceeds to step F508. In step F508, the cache controller 21 sorts the valid cache lines CL one by one from the beginning of the cache line mode area.

Then, in step F509, the cache controller 21 calculates the number of cache lines CL (E) necessary for the ECC mode.

Next, in step F510, the cache controller 21 sets the ECC bits Eb and the dirty bits Db of E of the cache lines CL from the beginning of the ECC mode area at "1" and "0," respectively. That is, the cache controller 21 forms the cache lines CL in the ECC mode.

Then, in step F511, the cache controller 21 calculates pieces of ECC data EC for each of the valid cache lines CL.

Next, in step F512, the cache controller 21 writes pieces of the ECC data EC in the corresponding cache lines CL as shown in FIG. 10.

Thus, the cache controller 21 forms the cache lines CL in the ECC mode necessary for the ECC data areas.

The standby preparation processing of the nonvolatile memory part 22 is thus completed, and the cache controller 21 transmits a standby completion signal to the processor 10 in step F513 to complete a series of the processing.

On the other hand, if the number of the cache lines CL in the cache line mode area (C) is less than the number of the valid cache lines CL (V) in step F503, the cache controller 21 proceeds to step F504.

First, in step F504, the cache controller 21 selects (V-C) of the valid cache lines CL.

Then, in step F505, the cache controller 21 determines whether the dirty bit Db of each of the selected (V-C) cache lines CL is "0."

If the dirty bits Db of all the (V-C) cache lines CL are "0," the cache controller 21 directly proceeds to step F507. In step F507, the cache controller 21 sets the valid bits Vb of the selected cache lines CL at "0." That is, the cache controller 21 invalidates the valid bits Vb of the selected cache lines CL.

Next, the cache controller 21 performs the processing of step F502 again. Then, if the relationship C≥V is established in step F503, the cache controller 21 performs the processing of steps F508 to F513.

Further, if it is determined in step F505 that the cache lines CL whose dirty bit Db is "1" exist among the selected (V-C) cache lines CL, the cache controller 21 performs the processing of step F506. In this case, pieces of the cache data CD of the cache lines CL whose dirty bit Db is "1" among the selected cache lines CL are different from pieces of the data of the main memory 12. Therefore, the cache controller 21 reads pieces of the cache data CD and the main-memory addresses from the cache lines CL and writes back pieces of the read cache data CD and the main-memory addresses to the main memory 12.

Thus, the cache controller 21 reflects the update of pieces of the cache data CD on pieces of the data of the main memory 12.

After that, the cache controller 21 performs the processing of step F502 again via the processing of step F507. Then, if the relationship C V is established in step F503, the cache controller 21 performs the processing of steps F508 to F513.

The restoration processing of the second embodiment is basically the same as that of the first embodiment shown in FIG. 8. The difference in the restoration processing between the first and second embodiments is that the selection of the corresponding cache lines CL in the ECC mode in step F403 of FIG. 8 is not based on the cache addresses CA but uniquely determined as shown in FIG. 10 in the second embodiment.

The second embodiment described above produces the same effects as those of the first embodiment. In addition, because it is not necessary for cache lines CL in the ECC mode to store cache addresses CA, they are effective for storing pieces of ECC data EC. For example, the second embodiment is advantageous in that it is possible to correspond to a greater number of cache lines CL in the cache line mode with one cache line CL in the ECC mode or increase the redundancy of an ECC parity to enhance correction performance.

(4) Third Embodiment

Next, a third embodiment will be described. Note that descriptions of the same parts as those of the first embodiment will be omitted.

Figure 12:
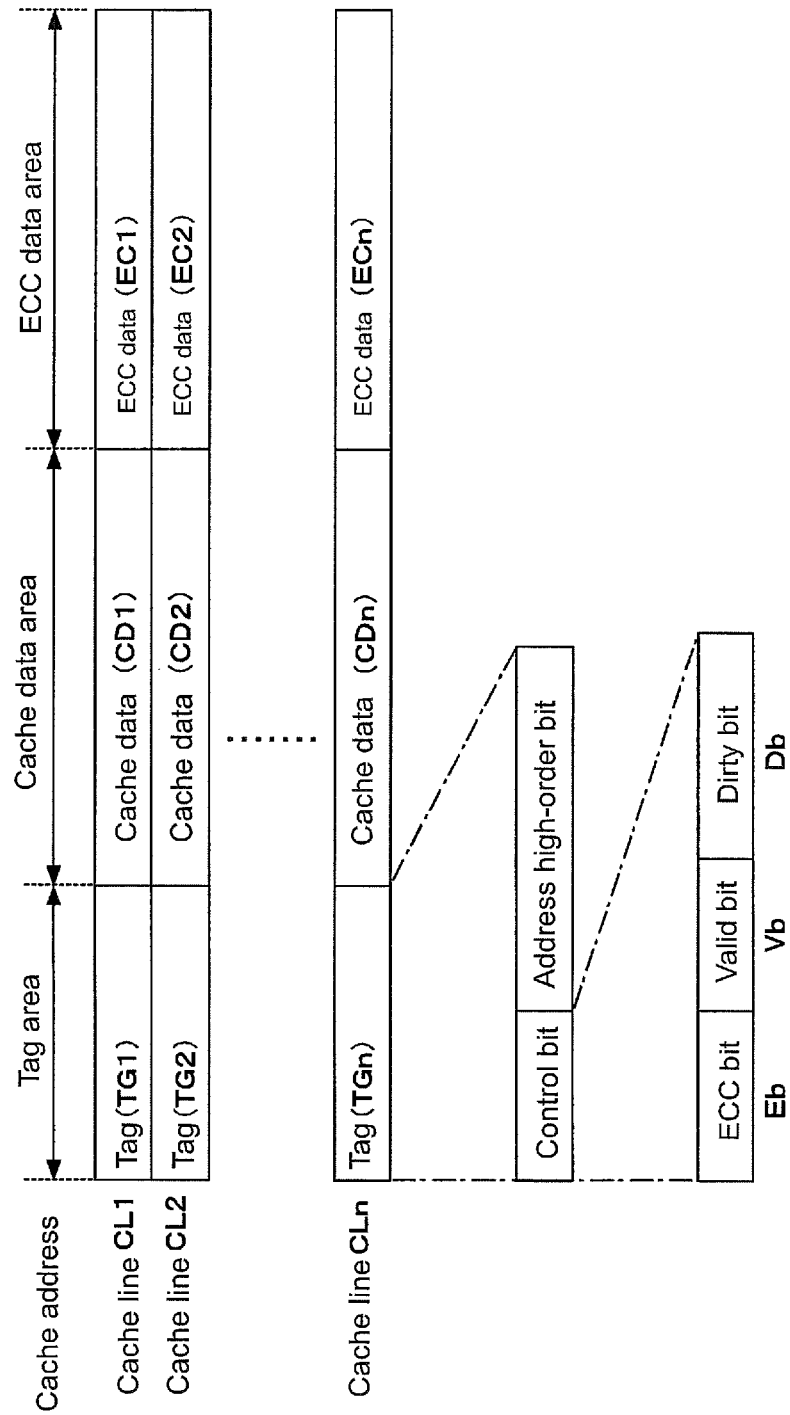
FIG. 12 is a diagram for explaining cache lines according to a third embodiment.

In the third embodiment, cache lines CL are configured in the manner as shown in FIG. 12. Further, the data structures of the cache lines CL are configured as shown in FIG. 13 to correspond to an operation state and a standby state.

As shown in FIG. 12, each of the cache lines CL includes an ECC data area besides the configuration of the first embodiment.

Figure 13:
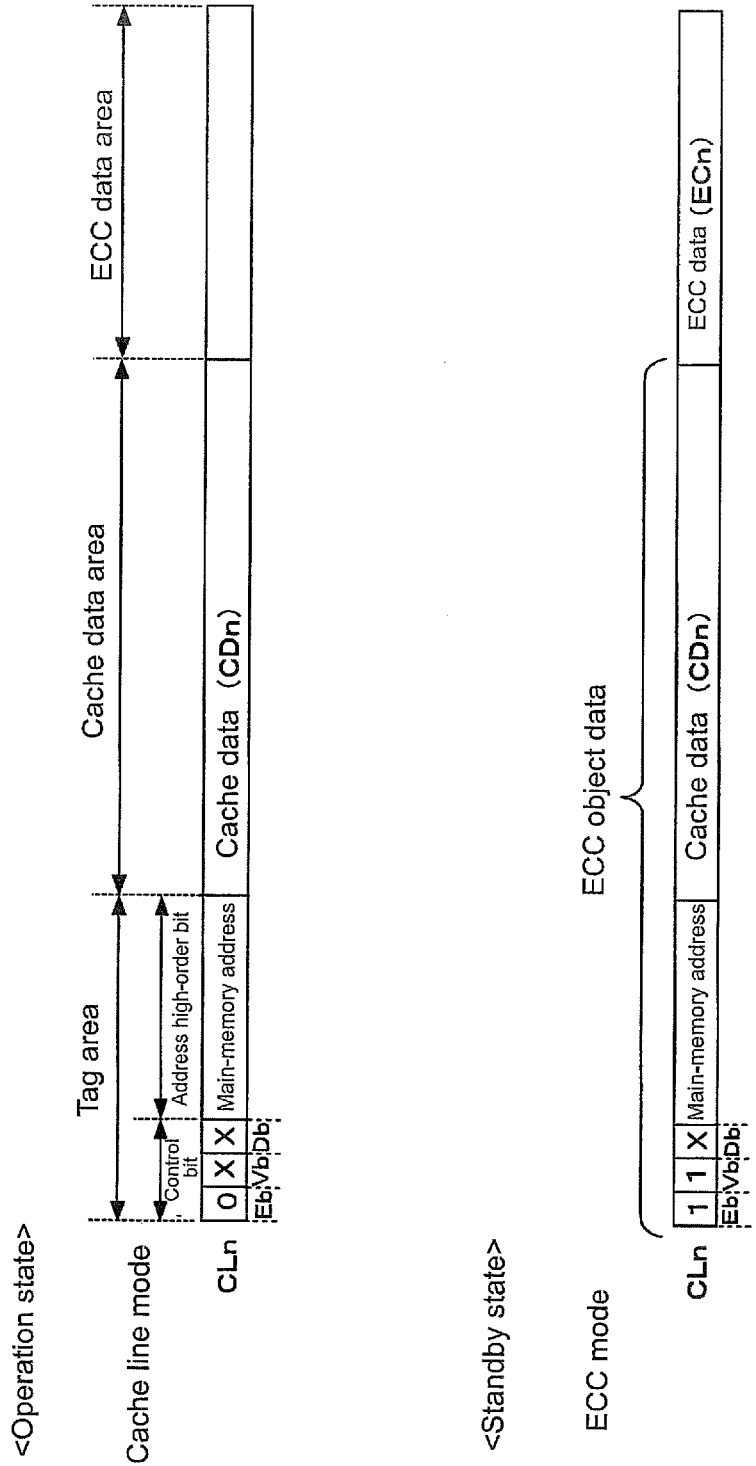
FIG. 13 is a diagram for explaining the data structures of the cache lines in the operation state and the standby state according to the third embodiment.

As shown in FIG. 13, in the operation state, the input and output of data is performed on the tag area and the cache data area of each of the cache lines CL only, but not performed on the ECC data area thereof.

In the process of shifting to the standby state, all valid cache lines CL enter an ECC mode where the ECC bits Eb of the cache lines CL are set at "1." In other words, both the ECC bits Eb and the valid bits Vb of the cache lines CL become "1."

The dirty bit Db, the address high-order bits (main-memory address), and the cache data CD of each of the cache lines CL constitute ECC object data to be subjected to error correction.

ECC data is calculated based on the ECC object data and stored in each of the ECC data areas of the same cache lines CL.

Because the ECC object data and the ECC data exist together in each of the cache lines CL, it is not necessary to store cache addresses CA.

In the process of restoring to the operation state, the ECC object data and the ECC data are combined together to constitute an error correcting code to perform error correction on each of the cache lines CL whose ECC bit Eb and valid bit Vb are "1." If necessary, correct data is written in the ECC object data. If any of the ECC bits and the valid bits of the cache lines CL is changed to "0" in the standby state, the cache lines CL are invalidated.

Thus, it becomes unnecessary to perform scanning to find where the ECC data EC exists in each of the cache lines CL.

Further, because each of the cache lines CL has the ECC data area, it is possible to prevent such a situation that valid cache lines CL are caused to enter the ECC mode to cope with the insufficiency of invalid cache lines CL.

Figure 14:
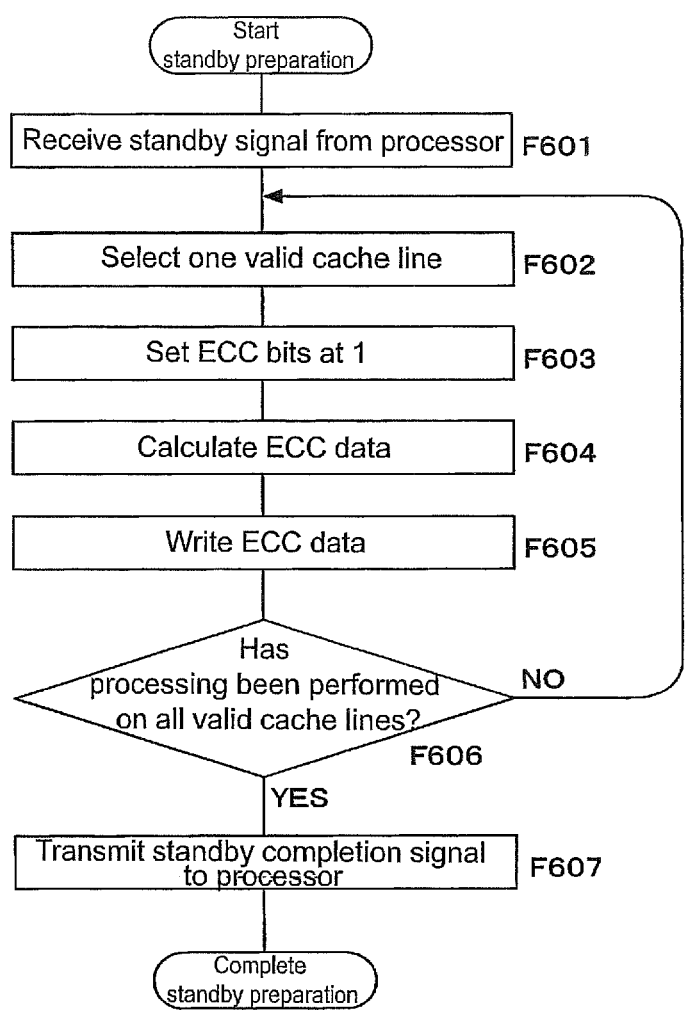
FIG. 14 is a flowchart showing the process of shifting to the standby state according to the third embodiment.

FIG. 14 is a flowchart showing standby preparation processing in the third embodiment.

In step F601, the cache controller 21 receives a standby signal from the processor 10.

Then, in step F602, the cache controller 21 selects one of valid cache lines CL in the nonvolatile memory part 22.

Next, in step F603, the cache controller 21 sets the ECC bit Eb of the selected cache line CL at "1."

That is, the cache controller 21 converts the selected cache line CL into a cache line CL in the ECC mode.

In step F604, the cache controller 21 calculates the ECC data EC of the selected cache line CL.

Then, in step F605, the cache controller 21 writes the ECC data EC in the ECC data area of the cache line CL.

Thus, the cache controller 21 converts the valid cache line CL into the cache line CL in the ECC mode.

In step F606, the cache controller 21 determines whether the processing of steps F602 to F605 has been performed on all the valid cache lines CL. If not, the cache controller 21 returns to step F602 to perform the processing of steps F602 to F605 on the remaining cache lines CL in the cache line mode.

After converting all the cache lines CL in the cache line mode into the cache lines CL in the ECC mode in the processing of steps F602 to F605, the cache controller 21 proceeds to step F607. In step F607, the cache controller 21 transmits a standby completion signal to the processor 10 to complete a series of the processing.

The restoration processing of the third embodiment may be performed in the same manner as that of the first embodiment shown in FIG. 8. However, the differences in the restoration processing between the first and third embodiments are that in the third embodiment one of the cache lines CL in the ECC mode is selected in the processing of step F402 in FIG. 8 and the processing of step F403 in FIG. 8 is eliminated. Moreover, in the processing of step F404, the error correction of the cache line CL in the ECC mode is performed using the ECC data of the selected cache line CL.

That is, because the ECC data EC is stored in the cache line CL to be subjected to error correction, the restoration processing is simplified.

As described above, in the third embodiment, the nonvolatile memory part 22 has plurality of cache lines CL each including a cache data area and a standby state data area (ECC data area).

As the standby preparation processing, the cache controller 21 generates for at least some of the cache lines CL pieces of standby state data each containing ECC data EC enabling the error correction of cache data stored in each of the cache lines CL. Then, the cache controller 21 stores pieces of the standby state data in standby state data areas. Further, the cache controller 21 brings the cache lines CL into a state representing that the cache lines CL store pieces of the standby state data (i.e., the cache controller 21 sets the ECC bits Eb of the cache lines CL at "1").

The third embodiment also produces the same effects as those of the first and second embodiments. In addition, the standby preparation processing and the restoration processing can be simplified. Moreover, it becomes unnecessary to invalidate valid cache lines CL to cope with the insufficiency of cache lines CL at the standby preparation processing.

(5) Fourth Embodiment

Next, a fourth embodiment will be described. This embodiment refers to an example where EDC data (error detecting data) is used as standby state data.

Figure 15:
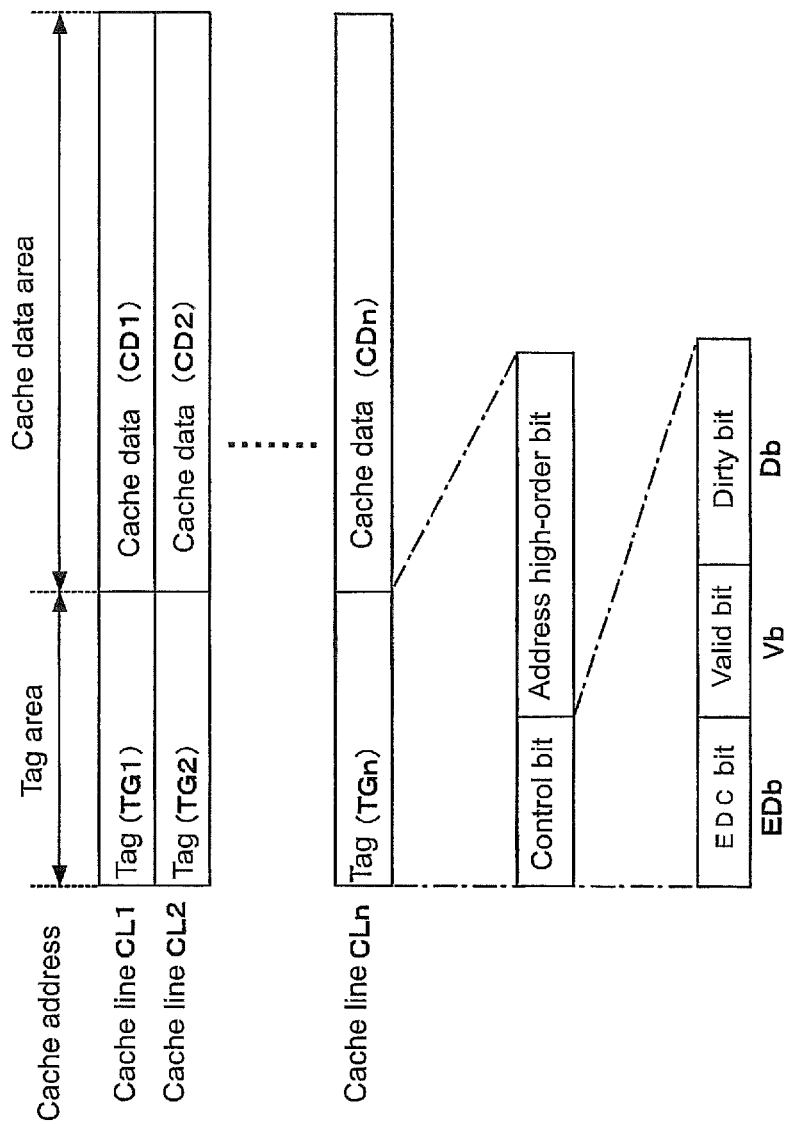
FIG. 15 is a diagram for explaining cache lines according to a fourth embodiment.

FIG. 15 shows the data structure of cache lines CL.

In the data structure of the fourth embodiment, the ECC bits Eb of the data structure of the first embodiment shown in FIG. 2 are replaced by EDC bits EDb.

The EDC bits EDb are bits used when the nonvolatile cache memory 11 is in a standby state and representing that the cache lines CL enter an EDC mode. In other regards, the data structure of the cache lines CL of the fourth embodiment is the same as that of the cache lines CL of the first embodiment shown in FIG. 3.

In an operation mode, all the cache lines CL enter a cache line mode as in FIG. 3.

Further, when shifting from an operation state to the standby state, the cache lines CL are divided into cache lines CL in the cache line mode and cache lines CL in the EDC mode.

Figure 16:
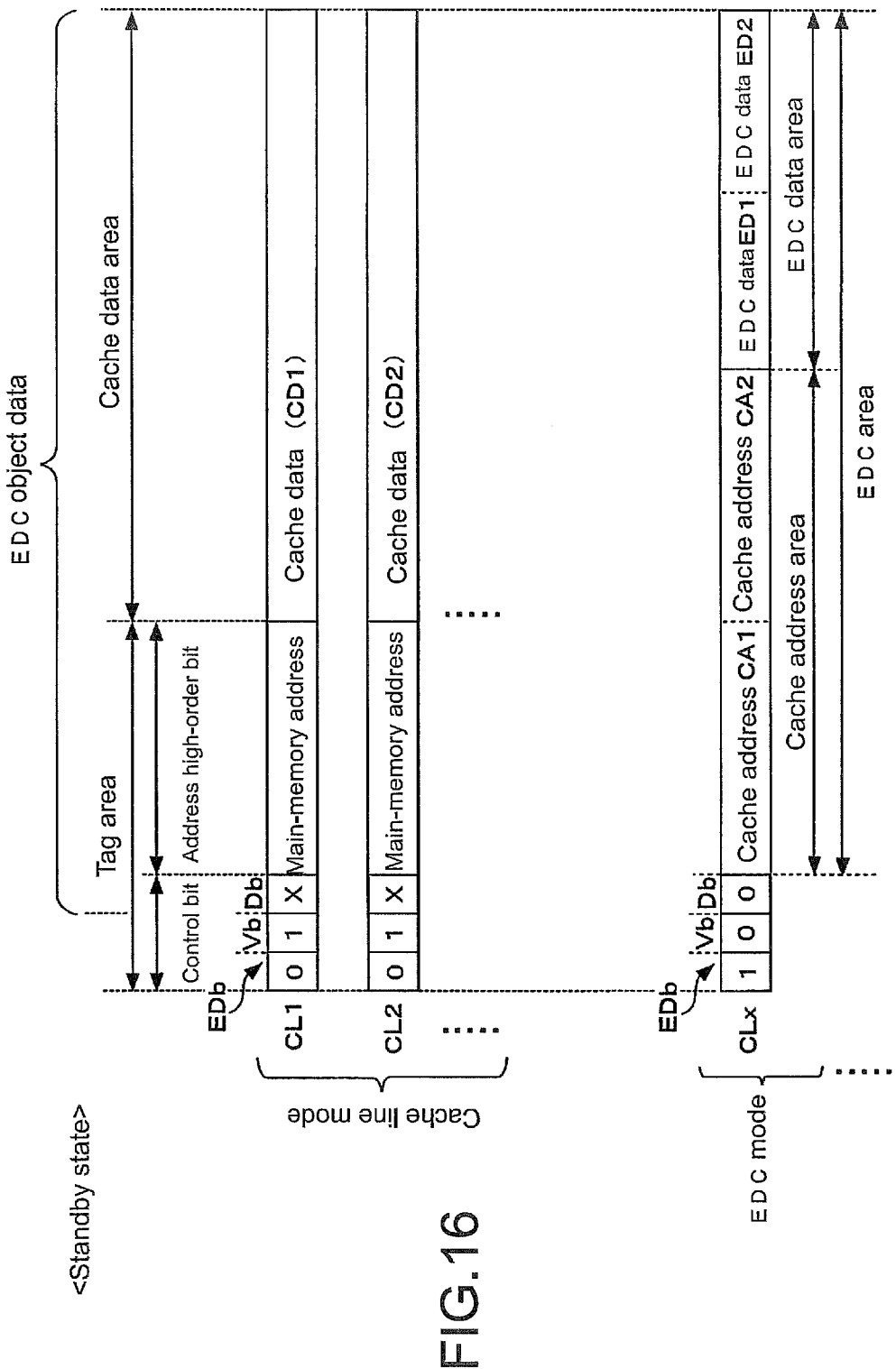
FIG. 16 is a diagram for explaining the data structure of the cache lines in the standby state according to the fourth embodiment.

In the fourth embodiment, the EDC bit EDb of each of the cache lines CL in the EDC mode is set at "1," and the valid bit Vb and the dirty bit Db thereof are set at "0" as shown in FIG. 16.

Further, an area other than the area of the control bit of each of the cache lines CL in the EDC mode is referred to as an EDC area. The EDC area includes a cache address area that stores cache addresses CA and an EDC data area that stores pieces of EDC data ED.

In the data structure shown in FIG. 16, pieces of the ECC data EC of the first embodiment are basically replaced by pieces of the EDC data ED, and basic structures and data contents of the cache lines CL of the fourth embodiment are the same as those of the cache lines CL of the first embodiment shown in FIG. 4.

In the standby state, the dirty bit Db, the address high-order bits, and the cache data CD of each of the cache lines CL in the cache line mode constitute EDC object data. Then, the EDC object data is subjected to error detection coding to obtain EDC data ED.

Here, a combination of the EDC object data and the EDC data is an error correcting code. Of the generated error correcting code, part other than the EDC object data (EDC parity) is the EDC data.

The EDC data is stored in the EDC data area of each of the cache lines CL in the EDC mode.

At this time, the address of each of the cache lines CL (cache address CA) is stored in the cache address area to show from which of the cache lines CL the EDC data is derived.

FIG. 17 shows a processing example in a case where the cache controller 21 receives a standby signal from the processor 10 in the process of shifting from the normal operation state to the standby state, i.e., an example of the standby preparation processing of the cache controller 10. The basic flow of the processing is the same as that of the processing shown in FIG. 7.

In step F701, the cache controller 21 receives a standby signal from the processor 10.

In step F702, the cache controller 21 counts the number of valid cache lines CL in the nonvolatile memory part 22.

Next, in step F703, the cache controller 21 calculates the number of cache lines CL necessary for the EDC mode. The number of the necessary cache lines CL is represented as E.

Then, in step F704, the cache controller 21 determines whether the number of invalid cache lines CL (I) is greater than the number of the necessary cache lines CL (E).

Where the relationship I E is established, the cache lines CL in the EDC mode can be formed using the invalid cache lines CL. Therefore, the cache controller 21 proceeds to step F709. In step F709, the cache controller 21 selects E of the invalid cache lines CL. The cache controller 21 sets all the EDC bits EDb and the dirty bits Db of the selected E cache lines CL at "1" and "0," respectively.

In step F710, the cache controller 21 calculates pieces of the EDC data ED for each of the valid cache lines CL.

Then, in step F711, the cache controller 21 writes cache addresses CA and pieces of the EDC data ED in the cache lines CL selected in step F709.

The cache controller 21 completes the standby preparation processing in the nonvolatile memory part 22 as described above. Accordingly, the cache controller 21 transmits a standby completion signal to the processor 10 in step F712 to complete a series of the processing.

On the other hand, if the number of the invalid cache lines CL (I) is less than the number of the necessary cache lines CL (E) in step F704, the cache controller 21 proceeds to step F705. Note that the processing of steps F705 to F708 are the same as those of steps F305 to F308 shown in FIG. 7, and thus descriptions thereof will be omitted.

Next, FIG. 18 shows a processing example of the cache controller 21 when receiving a restoration signal from the processor 10 in the process of shifting from the standby state to the operation state, i.e., an example of the restoration processing of the cache controller 21.

In step F901, the cache controller 21 receives a restoration signal from the processor 10.

In step F902, the cache controller 21 selects one of cache lines CL in the cache line mode from the nonvolatile memory part 22.

In step F903, the cache controller 21 selects a cache line CL in the EDC mode where the cache address CA of the selected cache line CL is stored.

In step F904, the cache controller 21 reads EDC data ED corresponding to the cache line CL in the cache line mode selected in step F902 from the cache line CL in the EDC mode selected in step F903 to perform the error detection processing of the cache line CL in the cache line mode.

If no error is detected from the cache line CL, the cache line CL in the cache line mode is free from data loss or the like and represents that the cache line CL is in a normal state.

On the other hand, if an error is detected from the cache line CL, the cache line CL suffers from any problem and the data contents (contents of the EDC object data) of the cache line CL become incorrect.

Therefore, if the error is detected, the cache controller 21 proceeds from step F905 to step F906 to invalidate the cache line CL. Specifically, the cache controller 21 sets the valid bit Vb of the cache line CL at "0."

If no error is detected, the cache controller 21 retains the cache line CL as it is.

In step F907, the cache controller 21 determines whether the error detection processing has been performed on all the cache lines CL in the cache line mode. If not, the cache controller 21 returns to step F902 to perform the processing of steps F902 to F906 on the remaining cache lines CL in the cache line mode.

When the error detection processing has been performed on all the cache lines CL in the cache line mode, the cache controller 21 proceeds to step F908. In step F908, the cache controller 21 sets the EDC bits EDb of all the cache lines CL in the EDC mode at "0" to merely become invalid cache lines CL.

Then, in step F909, the cache controller 21 transmits a restoration completion signal to the processor 10 to complete a series of the processing.

As in the fourth embodiment described above, the EDC data ED can be used as the standby state data.

If an error is detected from any of the cache lines CL in the restoration processing, the cache controller 21 invalidates the cache line CL to prevent the use of incorrect cache data at a subsequent stage.

The EDC data areas can have a less parity area per cache line than the ECC data areas.

Note that the cache controller 21 invalidates a cache line CL if an error is detected from the cache lines CL. However, in this case, because the cache controller 21 invalidates the cache line CL whose dirty bit Db is "1," there is a likelihood of the update of data in the nonvolatile cache memory 11 being not reflected on the main memory 12. In order to prevent the problem, it is therefore desirable to write back pieces of data of all the cache lines CL whose dirty bit Db is "1" to the main memory 12 before proceeding to the process of receiving the standby signal and converting pieces of the data.

(6) Modification

The present disclosure is not limited to the embodiments described above but may employ various other configurations without departing from the scope of the present disclosure.

In the respective embodiments, it is also possible to write back pieces of the data of all the cache lines CL whose dirty bit Db is "1" to the main memory 12 before proceeding to the process of receiving the standby signal and converting pieces of the data. After pieces of the data of the cache lines CL are written back to the main memory 12, the dirty bits Db of the cache lines CL are set at "0." Thus, it becomes unnecessary to check up the dirty bits Db of the cache lines CL every time the valid cache lines CL are allocated to the ECC mode (or the EDC mode).

Further, the fourth embodiment refers to the case where an example of using pieces of the EDC data ED is applied to the same data structure as that of the first embodiment. However, it is, of course, assumed to apply pieces of the EDC data to the same data structure as those of the second and third embodiments instead of pieces of the ECC data.

Further, in the respective embodiments, as a preparation for the interruption of the power supply, the cache controller 21 performs the standby preparation processing to generate standby state data and store the generated standby state data in the nonvolatile memory part 22 when receiving the standby signal from the processor 10, i.e., immediately before the interruption of the power supply. However, the cache controller 21 may perform the standby preparation processing at other timings.

For example, the cache controller 21 may substantially-periodically perform the standby preparation processing. However, contents of the cache data CD immediately before the interruption of the power supply may not be necessarily reflected. Therefore, when performing the standby preparation processing at a timing other than a timing immediately before the interruption of the power supply, it is necessary to manage the validity and invalidity of the cache lines CL in the ECC mode (or the EDC mode) later.

Moreover, for example, in a battery-driven computer system or the like, the nonvolatile cache memory 11 may detect a power voltage state and voluntarily perform the standby preparation processing immediately before the timing at which the power supply is interrupted.

The restoration processing may be performed prior to the first cache operation after the resumption. Accordingly, the restoration processing may be performed based on signals other than the restoration signal from the processor 10.

Further, for the purpose of performing processing other than the error correction processing or the error detection processing, it is also possible to change the data structure of the cache lines CL to correspond to the operation state and the standby state.

Note that the present disclosure may also employ the following configurations.

(1) A nonvolatile cache memory, including:
a nonvolatile memory part configured to store cache data; and
a cache controller configured
to control reading and writing of the cache data with respect to the nonvolatile memory part,
to perform, as a preparation for an interruption of power supply, standby preparation processing to generate standby state data and store the generated standby state data in the nonvolatile memory part, and to perform, at resumption of the power supply, restoration processing of the cache data stored in the nonvolatile memory part using the standby state data.

(2) The nonvolatile cache memory according to (1), in which the cache controller is configured to generate the standby state data containing error correcting data enabling error correction of at least the cache data stored in the nonvolatile memory part and store the generated standby state data in the nonvolatile memory part as the standby preparation processing, and to perform error correction processing of the cache data stored in the nonvolatile memory part using the error correcting data contained in the standby state data as the restoration processing.

(3) The nonvolatile cache memory according to (1) or (2), in which the nonvolatile memory part has a plurality of cache lines each configured to store the cache data, and the cache controller is configured to perform, as the standby preparation processing, processing to generate for at least part of the cache lines the standby state data containing error correcting data enabling error correction of the cache data stored in the cache line, store the generated standby state data in another of the cache lines, and bring the other cache line into a state representing that the cache line stores the standby state data.

(4) The nonvolatile cache memory according to (3), in which the standby state data containing the error correcting data further contains address information of the cache line storing the cache data on which the error correction is performed using the error correcting data.

(5) The nonvolatile cache memory according to (3), in which the cache controller is configured to store the standby state data in an area corresponding to the cache line storing the cache data as an object of the standby state data.

(6) The nonvolatile cache memory according to (1) or (2), in which the nonvolatile memory part has a plurality of cache lines each containing a cache data area and a standby state data area, and the cache controller is configured to perform, as the standby preparation processing, processing to generate for at least part of the cache lines the standby state data containing error correcting data enabling error correction of the cache data stored in the cache line, store the generated standby state data in the standby state data area, and bring the cache line into a state representing that the cache line stores the standby state data.

(7) The nonvolatile cache memory according to (1), in which the cache controller is configured to generate the standby state data containing error detecting data enabling error detection of at least the cache data stored in the nonvolatile memory part and store the generated standby state data in the nonvolatile memory part as the standby preparation processing, and to perform error detection processing of the cache data stored in the nonvolatile memory part using the error detecting data contained in the standby state data as the restoration processing.

(8) The nonvolatile cache memory according to (7), in which the cache controller is configured to perform processing to invalidate the cache data from which an error is detected by the error detection processing.

(9) The nonvolatile cache memory according to (1) to (8), in which the cache controller is configured to perform the standby preparation processing upon receiving a standby signal requesting for shifting to a standby state where the power supply is interrupted.

The present disclosure contains subject matter related to that disclosed in Japanese Priority Patent Application JP 2011-259796 filed in the Japan Patent Office on Nov. 29, 2011, the entire content of which is hereby incorporated by reference.

What is claimed is:

1. A nonvolatile cache memory, comprising:
a nonvolatile memory part having a plurality of cache lines configured to store cache data; and
a cache controller configured to:
control reading and writing of the cache data with respect to the nonvolatile memory part,
perform standby preparation processing to generate standby state data by converting the plurality of cache lines in the nonvolatile memory part into data structures for use in a standby state and storing the generated standby state data in the nonvolatile memory part, and
perform restoration processing of the cache data stored in the nonvolatile memory part, effective upon resumption of the power supply, said restoration processing including reconverting the plurality of cache lines into data structures for an operation state.

2. The nonvolatile cache memory according to claim 1, wherein
the cache controller is configured to:
generate the standby state data containing error correcting data enabling error correction of at least the cache data stored in the nonvolatile memory part and store the generated standby state data in the nonvolatile memory part as the standby preparation processing, and
perform error correction processing of the cache data stored in the nonvolatile memory part using the error correcting data contained in the standby state data as the restoration processing.

3. The nonvolatile cache memory according to claim 1, wherein
the nonvolatile memory part has a plurality of cache lines each containing a cache data area and a standby state data area, and
the cache controller is configured to perform, as the standby preparation processing, processing to:
generate for at least part of the cache lines the standby state data containing error correcting data enabling error correction of the cache data stored in the cache line,
store the generated standby state data in the standby state data area, and
bring the cache line into a state representing that the cache line stores the standby state data.

4. The nonvolatile cache memory according to claim 1, wherein
the cache controller is configured to:
generate the standby state data containing error detecting data enabling error detection of at least the cache data stored in the nonvolatile memory part and store the generated standby state data in the nonvolatile memory part as the standby preparation processing, and perform error detection processing of the cache data stored in the nonvolatile memory part using the error detecting data contained in the standby state data as the restoration processing.

5. The nonvolatile cache memory according to claim 4, wherein the cache controller is configured to perform processing to invalidate the cache data from which an error is detected by the error detection processing.

6. The nonvolatile cache memory according to claim 1, wherein
the cache controller is configured to perform standby preparation processing when a number of invalid cache lines is greater than a number of necessary cache lines.

7. A nonvolatile cache memory, comprising:
a nonvolatile memory part having a plurality of cache lines configured to store cache data;
a cache controller configured to:
control reading and writing of the cache data with respect to the nonvolatile memory part,
perform, as a preparation for an interruption of power supply, standby preparation processing to generate standby state data and store the generated standby state data in the nonvolatile memory part,
perform, at resumption of the power supply, restoration processing of the cache data stored in the nonvolatile memory part using the standby state data,
generate for at least part of the cache lines the standby state data containing error correcting data enabling error correction of the cache data stored in the cache line,
store the generated standby state data in another of the cache lines, and
bring the other cache line into a state representing that the cache line stores the standby state data.

8. The nonvolatile cache memory according to claim 7, wherein the standby state data containing the error correcting data further contains address information of the cache line storing the cache data on which the error correction is performed using the error correcting data.

9. The nonvolatile cache memory according to claim 7, wherein the cache controller is configured to store the standby state data in an area corresponding to the cache line storing the cache data as an object of the standby state data.

10. The nonvolatile cache memory according to claim 1, wherein the cache controller is configured to perform the standby preparation processing upon receiving a standby signal requesting for shifting to a standby state where the power supply is interrupted.

11. A processing method of a nonvolatile cache memory having a nonvolatile memory part containing a plurality of cache lines configured to store cache data, the processing method comprising:
performing standby preparation processing to generate standby state data by converting the plurality of cache lines in the nonvolatile memory part into data structures for use in a standby state and storing the generated standby state data in the nonvolatile memory part, and
performing restoration processing of the cache data stored in the nonvolatile memory part, during resumption of the power supply and reconverting the plurality of cache lines into data structures for an operation state.

12. The processing method according to claim 11, further comprising:
generating the standby state data containing error correcting data enabling error correction of at least the cache data stored in the nonvolatile memory part and store the generated standby state data in the nonvolatile memory part as the standby preparation processing, and
performing error correction processing of the cache data stored in the nonvolatile memory part using the error correcting data contained in the standby state data as the restoration processing.

13. The processing method according to claim 11, further comprising:
generating for at least part of the cache lines the standby state data containing error correcting data enabling error correction of the cache data stored in the cache line,
storing the generated standby state data in the standby state data area, and
bringing the cache line into a state representing that the cache line stores the standby state data.

14. The processing method according to claim 13, wherein the cache controller is configured to perform processing to invalidate the cache data from which an error is detected by the error detection processing.

15. The processing method according to claim 11, further comprising:
generating the standby state data containing error detecting data enabling error detection of at least the cache data stored in the nonvolatile memory part and store the generated standby state data in the nonvolatile memory part as the standby preparation processing, and
performing error detection processing of the cache data stored in the nonvolatile memory part using the error detecting data contained in the standby state data as the restoration processing.

16. A computer system, comprising:
a processor;
a nonvolatile cache memory;
a power control circuit; and
a main memory,
the power control circuit being configured to control power supply to the processor and the nonvolatile cache memory,
the processor being configured to:
perform reading and writing of data with respect to the main memory via the nonvolatile cache memory,
transmit a standby signal requesting for shifting to a standby state to the nonvolatile cache memory when the power control circuit interrupts the power supply, and
transmit a restoration signal requesting for resuming the power supply and shifting to an operation state to the nonvolatile cache memory when the power control circuit resumes the power supply, and
the nonvolatile cache memory having:
a nonvolatile memory part having a plurality of cache lines configured to store cache data; and
a cache controller configured to:
control reading and writing of the cache data with respect to the nonvolatile memory part,
perform standby preparation processing to generate standby state data by converting the plurality of cache lines in the nonvolatile memory part into data structures for use in a standby state and storing the generated standby state data in the nonvolatile memory part, and perform restoration processing of the cache data stored in the nonvolatile memory part, during resumption of the power supply and reconverting the plurality of cache lines into data structures for an operation state.

17. The computer system according to claim 16, wherein the cache controller of the nonvolatile cache memory is configured to:
   transmit a standby completion signal representing completion of shifting to the standby state to the processor upon completing the standby preparation processing, and
   transmit a restoration completion signal representing completion of shifting to the operation state to the processor upon completing the restoration processing.

18. The computer system according to claim 16, wherein the cache controller is configured to:
   generate the standby state data containing error correcting data enabling error correction of at least the cache data stored in the nonvolatile memory part and store the generated standby state data in the nonvolatile memory part as the standby preparation processing, and
   perform error correction processing of the cache data stored in the nonvolatile memory part using the error correcting data contained in the standby state data as the restoration processing.

19. The computer system according to claim 16, wherein the nonvolatile memory part has a plurality of cache lines each containing a cache data area and a standby state data area, and
the cache controller is configured to perform, as the standby preparation processing, processing to:
   generate for at least part of the cache lines the standby state data containing error correcting data enabling error correction of the cache data stored in the cache line,
   store the generated standby state data in the standby state data area, and
   bring the cache line into a state representing that the cache line stores the standby state data.

20. The computer system according to claim 19, wherein the cache controller is configured to perform processing to invalidate the cache data from which an error is detected by the error detection processing.

21. The computer system according to claim 16, wherein the cache controller is configured to:
   generate the standby state data containing error detecting data enabling error detection of at least the cache data stored in the nonvolatile memory part and store the generated standby state data in the nonvolatile memory part as the standby preparation processing, and
   perform error detection processing of the cache data stored in the nonvolatile memory part using the error detecting data contained in the standby state data as the restoration processing.

22. The computer system according to claim 16, wherein the cache controller is configured to perform the standby preparation processing upon receiving a standby signal requesting for shifting to a standby state where the power supply is interrupted.

* * * * *